United States Patent [19]

Uchida et al.

[11] Patent Number: 5,399,660
[45] Date of Patent: Mar. 21, 1995

[54] SIZING AGENT COMPOSITE FOR PAPERMAKING

[75] Inventors: Sadayuki Uchida, Kasai; Tomohiko Nakata, Kakogawa; Yoshihide Ishikawa, Himeji; Masao Hamada, Kakogawa; Shinichi Kimura, Kakogawa; Satoru Iwasa, Kakogawa, all of Japan

[73] Assignee: Harima Chemicals, Inc., Hyogo, Japan

[21] Appl. No.: 54,975

[22] Filed: Apr. 30, 1993

[30] Foreign Application Priority Data

May 1, 1992 [JP] Japan ................... 4-139778
Jul. 14, 1992 [JP] Japan ................... 4-210845

[51] Int. Cl.⁶ .................. C08G 63/54; C08G 63/12
[52] U.S. Cl. .................. 528/295.3; 528/296; 528/306; 524/26; 524/270
[58] Field of Search .......... 524/26, 270; 528/295.3, 528/296, 306

[56] References Cited

FOREIGN PATENT DOCUMENTS 63-40312  3/1983  Japan .
2-36629  1/1985  Japan .
62-250297  4/1986  Japan .
63-120198  11/1986  Japan .
4-91292  7/1990  Japan .

*Primary Examiner*—Paul R. Michl
*Assistant Examiner*—LaVonda R. Dewitt
*Attorney, Agent, or Firm*—Birch, Stewart, Kolasch & Birch

[57] ABSTRACT

The invention provides a sizing agent with good stability, particularly which is rapid in getting started in the neutral zone and a method of producing the same.

A sizing agent for papermaking in neutral zone is characterized by a main component of said sizing agent being selected from the group consisting of a diester of rosin-based substances having a dicarboxylic acid or acid anhydride group expressed by the following formula (I), $$R_1-\overset{O}{\overset{\|}{C}}O-R_2-O\overset{O}{\overset{\|}{C}}-R_3 \qquad (I)$$

(in which $R_1$ represents a rosin acid residue or maleopimaric acid, $R_2$ represents a dihydric alcohol residue and $R_3$ represents a maleopimaric acid residue); and 2) a polyester reaction product expressed by the following formula (I'), $$[(R'_1CO)_x-R'_2-OC]_m-R'_3-[CO-R'_4-(OCR'_5)_z]_n \qquad (I')$$
$$\underset{(COOH)_y}{|}$$

(in which $R'_1$ and $R'_5$ represent a rosin acid residue or an $\alpha,\beta$-unsaturated polybasic carboxylic acid added rosin residue, at least one of them represents $\alpha,\beta$-unsaturated polybasic carboxylic acid added rosin residue, $R'_2$ and $R'_4$ represent polyhydric alcohol residues, $R'_3$ represents a polybasic carboxylic acid residue being at least tribasic, x and z are integers of 1 to 3, y is 0, 1 or 2 and m and n are 1 or 2); and 3) a mixture comprising a rosin, a rosin modified by $\alpha,\beta$-unsaturated carboxylic acid and/or or an anhydride thereof and a polyhydric alcohol ester of rosin.

17 Claims, 5 Drawing Sheets

FIG. 2
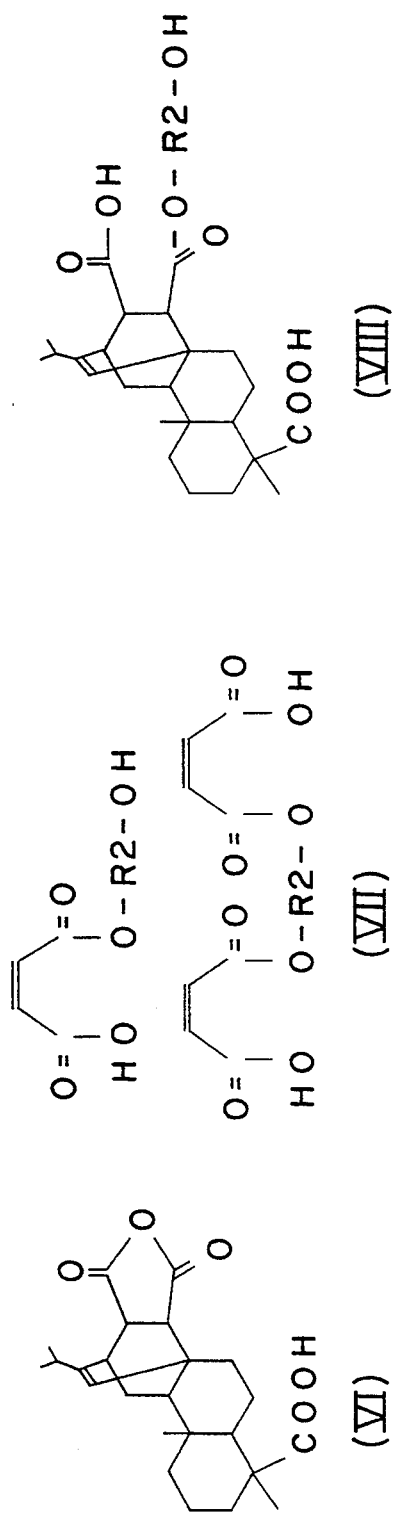
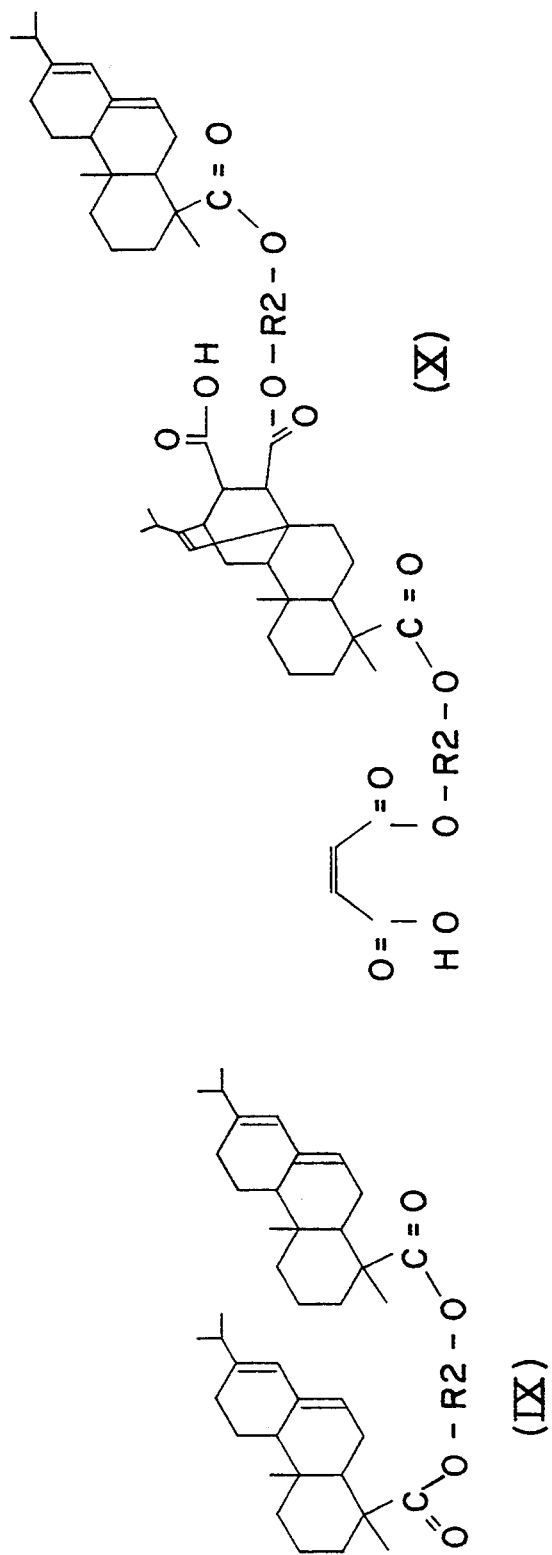

FIG. 3
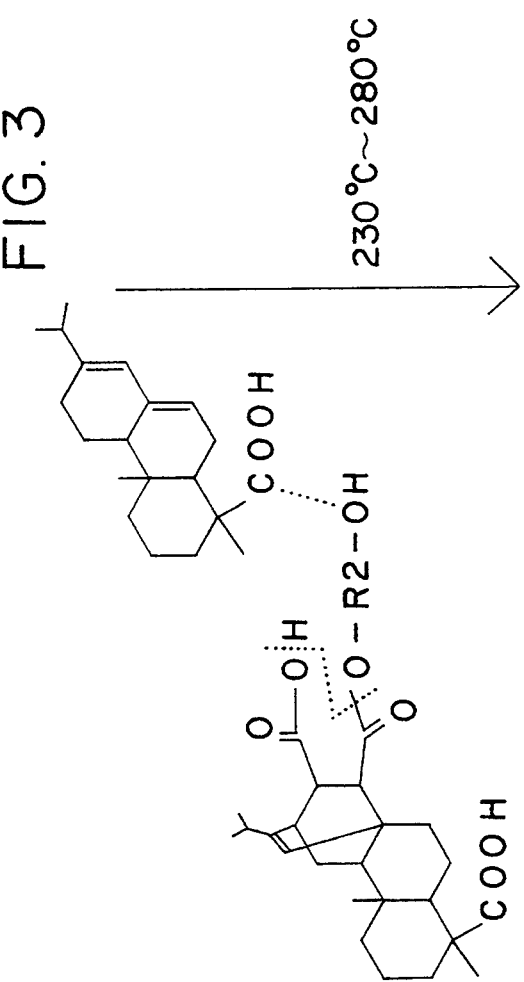
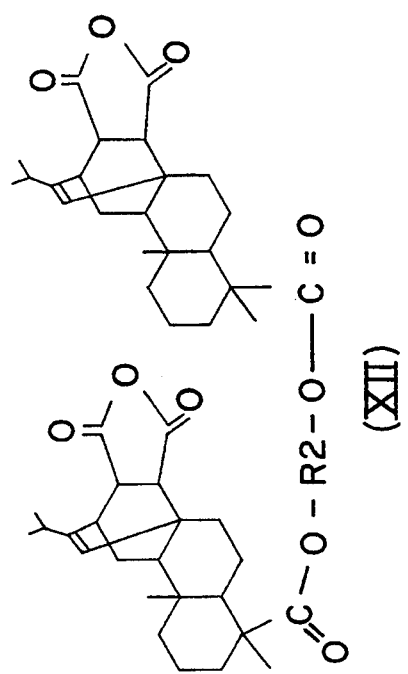
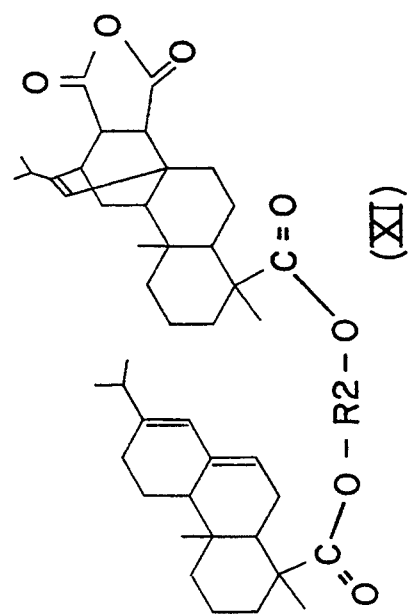
230°C~280°C
(XI)
(XII)

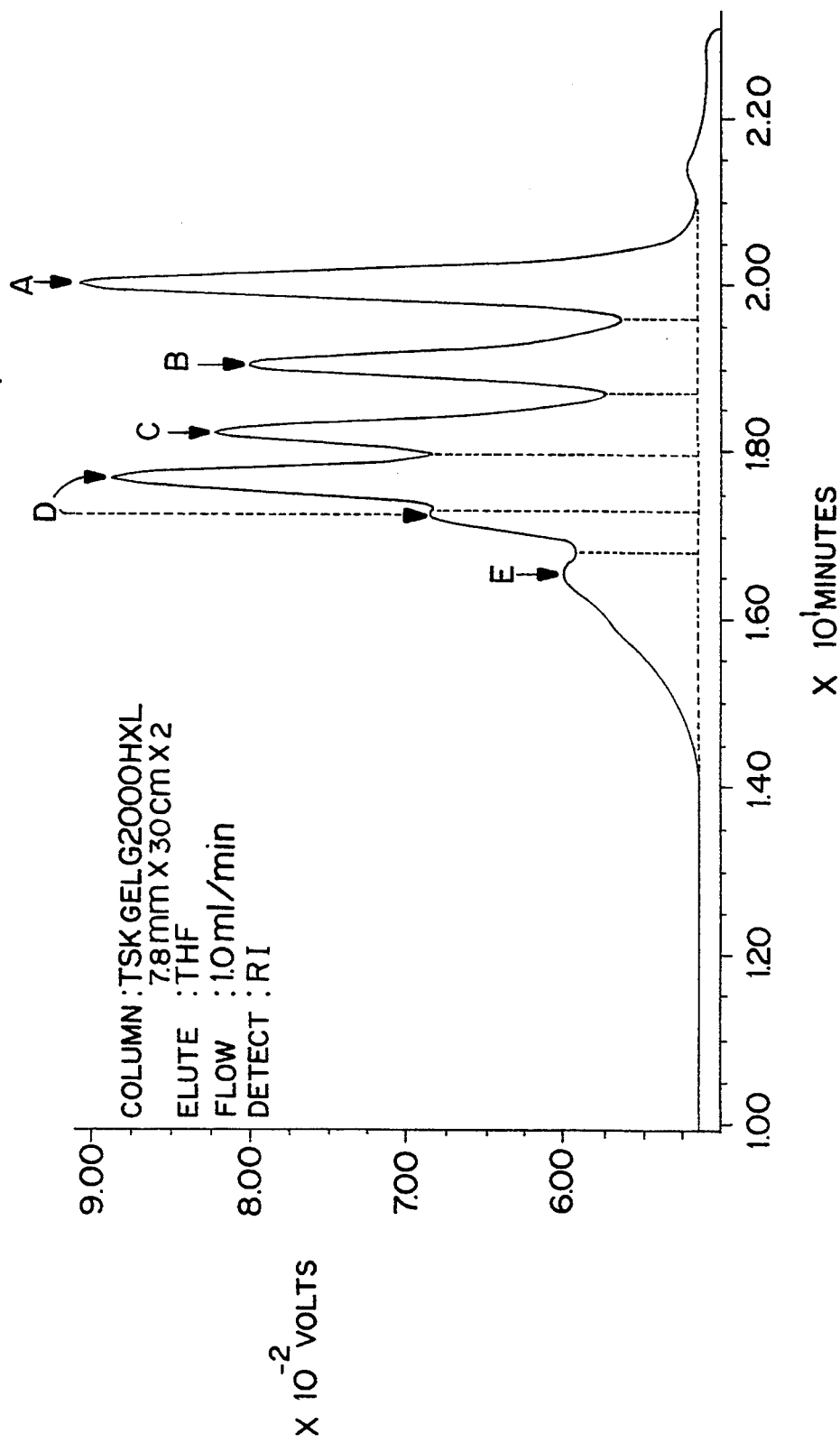

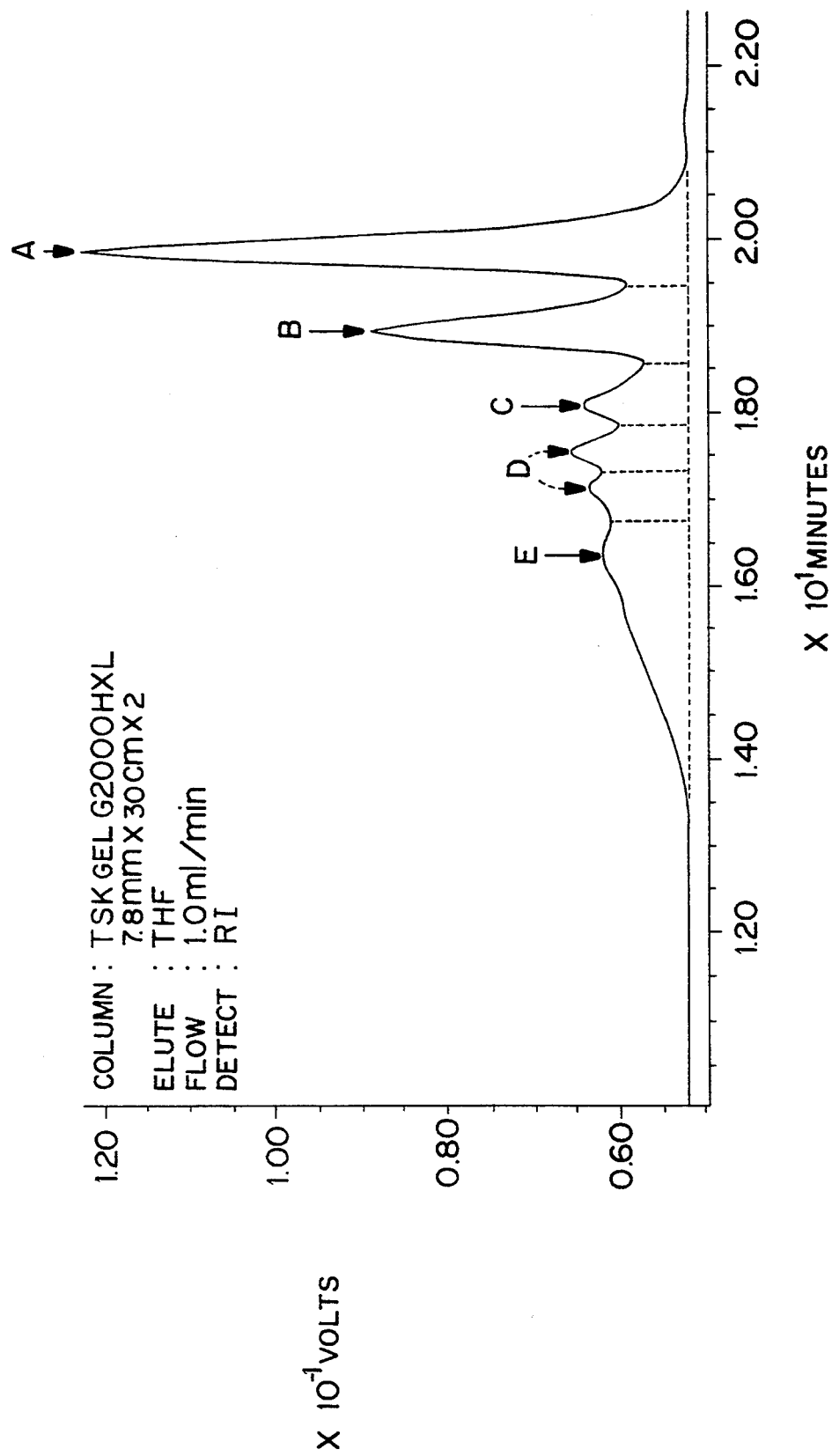

SIZING AGENT COMPOSITE FOR PAPERMAKING

INTRODUCTION

The invention relates to a sizing agent for papermaking, particularly to a sizing agent, added inside, which is very useful for neutral to weak acid in papermaking.

BACKGROUND OF THE INVENTION

Rosin-based agents have been used widely as sizing agents for some time. It has been known that the size development of the rosin-based sizing agents is due to the fact that the aluminium sulfate used as an assistant acts as a yield and a hydrophobic agent for the rosin-based sizing agents. Since this aluminium sulfate dissociates and shows acid, rosin-based sizing agents have been used in the acid range or zone.

However, in these days, a problem of durability exists for acid paper, and thus calcium carbonate is widely used as a coat color pigment for printing paper, thereby the amount of calcium carbonate contained within waste paper increases, resulting in the trend of making paper in the neutral range.

The conventional rosin-emulsion sizing agent uses mainly fortified rosin modified with an $\alpha,\beta$-unsaturated dibasic acid as an anionic surfactant and the sizing effect thereof decreases remarkably in the system described above, and particularly in the range above pH 6.5 for papermaking. The amount of sizing agent used must be increased so as to obtain the desired sizing level, thereby costs rise due to the excess amount of size, and disadvantages on operation occur such as foaming and deposition of pitch in the papermaking. Such factors have a bad influence on the nature of the prepared paper. Even if the amount of addition is increased in the range of pH 7.5 or more, satisfactory sizing property cannot be obtained in comparison with cellulose reactive sizing agents such as alkyl ketene dimer-based and alkenyl succinic acid anhydride-based sizing agents. AKD and ASA are used as dispersants whose protective colloid is cation starch and so on, however, the stability of these dispersant type of reactive sizing agents is bad. If they are accumulated in the papermaking, the stickiness increases with the destruction of the dispersant and big problems such as staining of the papermaking machines occur on operation, therefore, an improvement is required.

As described above, the improvement of AKD- and ASA-based sizing agents is being examined and recently, a rosin-based neutral sizing agent has been proposed. For example, it is known that Japanese Patent Tokkaisho 62-250297, 63-120198, Tokkouhei 2-36629 disclose the proposition.

Japanese Patent Tokkaisho 62-250297 discloses the reaction product of rosins, polyhydric alcohol consisting of C, H and a O and $\alpha,\beta$-unsaturated carboxylic acid derivative, and that the sizing effect decreases remarkably during the sizing above pH 7 of in a papermaking system, therefore, it being not necessarily a satisfactory sizing agent as a sizing agent for neutral paper.

On the other hand, the invention described in Japanese Patent Tokkaihei 2-36629 is characterized in that the sizing property around a neutral range due to the reaction of a partial amino alcohol ester of rosin with an $\alpha,\beta$-unsaturated dibasic acid is superior to the sizing property around a neutral range to polyhydric alcohol ester disclosed in 62-250297. However, a good emulsion cannot be obtained and as for the sizing property around neutral range, it cannot be said to be a satisfactory sizing agent.

The invention described in said Japanese Patent Tokkaisho 63-120198 is a rosin-based emulsion sizing agent comprising fortified rosin, methacrylic alkylester and/or copolymer of styrene-compound and methacrylic alkylaminoalkylester or methacrylic alkylaminoalkylamide, however, this agent has difficulty in the size in the neutral range and is not a satisfactory sizing agent for neutral paper.

Moreover, in Japanese Patent Tokkaisho 63-40312 and Tokkaihei 4-91292, copier paper for copying machine, using calcium carbonate as a filler and alkenyl-succinic acid anhydride as a sizing agent has good properties, but the rosin-based sizing agent is not suitable for copier paper for copying machines. This is because the conventional rosin-based sizing agent does not show the size in a pH range (weak acid range) for papermaking using much calcium carbonate and said paper is made under the conditions (in weak acid to acid range) using talc as a filler.

Then, in view of this situation, the object of the invention is to provide a better sizing agent with good stability, particularly which is rapid in getting started in the neutral range or zone, and a method of producing the same.

SUMMARY OF THE INVENTION

The invention was completed by finding that the following components showed an excellent size effect in a neutral to weak alkaline papermaking range or zone.

The main component of said sizing agent being selected from the group consisting of 1) a diester of rosin-based substances having a dicarboxylic acid or acid anhydride group expressed by the following formula (I),

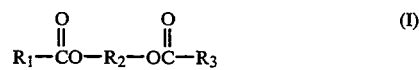

(in which $R_1$ represents a rosin acid residue or maleopimaric acid, $R_2$ represents a dihydric alcohol residue and $R_3$ represents a maleopimaric acid residue); and 2) a polyester reaction product expressed by the following formula (I'),

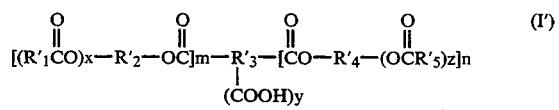

(in which $R'_1$ and $R'_5$ represent a rosin acid residue or an $\alpha,\beta$-unsaturated polybasic carboxylic acid added rosin residue, at least one of them represents $\alpha,\beta$-unsaturated polybasic carboxylic acid added rosin residue, $R'_2$ and $R'_4$ represent polyhydric alcohol residues, $R'_3$ represents a trihydric or more carboxylic acid residue, x and z are integers of 1 to 3, y is 0, 1 or 2 and m and n are 1 or 2); and 3) a mixture comprising a rosin, a rosin modified by $\alpha,\beta$-unsaturated carboxylic acid and/or or anhydride thereof and a polyhydric alcohol ester of rosin.

The compound expressed by the above-mentioned formula (I) is produced by reacting a)rosins, b)dihydric alcohols, c)α,β-unsaturated carbonyl compounds one by one or at the same time. Particularly, in the case of reacting a)rosins, b)dihydric alcohols and c)α,β-unsaturated carbonyl compounds one by one or at the same time, it is preferable that the ratio of the hydroxyl group equivalent of b) to the carboxyl group equivalent of a) is COOH/OH=1/0.2–1.5, and the α,β-unsaturated carbonyl compound is added at 2–20 parts by weight to 100 parts by weight of rosin.

The above-mentioned rosin can be selected from one or two or more kinds of rosins including gum rosin, tall oil rosin and wood rosin.

The above-mentioned dihydric alcohol is selected from the group including ethylene glycol, propylene glycol, neopentyl glycol and hydrogenated bisphenol A, and it is preferable to select one or two from ethylene glycol and propylene glycol which are dihydric alcohols having the boiling point of 210° C. or less.

And the above-mentioned α,β-carbonyl compound is selected from the group including maleic acid and maleic anhydride.

The reaction of dihydric alcohols having a low boiling temperature with rosin has not been previously studied by means of a reaction method which is effective industrially. The esterification reaction of dihydric alcohol having the boiling point of 210° C. or less and rosin must be done around 200°–210° C. for a long time. When the reaction is done at a high temperature above 230° C., dihydric alcohol having the low boiling temperature and the water distillated from the reaction are removed out of the system, resulting in much loss. In the case that α,β-unsaturated carbonyl compound is reacted with rosins after the esterification at high temperature, the rosins having the skeleton of levopimaric acid decrease and the isomerization occurs in the skeleton of dehydroabietic acid with the result that the reaction is very difficult to advance, which is an undesirable result. On the other hand, even if α,β-unsaturated carbonyl compounds and rosins are previously reacted and the reaction is conducted around 210° C., the result is undesirable in the view of the emulsification and the size since many polymeric condensates having a molecular weight of 1000 or more are produced.

As a result of our wholehearted study, we discovered that the reaction products having MW within the range of 500 to 1000 could be obtained by reacting preliminarily a)rosins, b)dihydric alcohols and c)α,β-unsaturated carbonyl compounds one by one or at the same time below the boiling point of the dihydric alcohol, usually at the temperature of 150° to 200° C., and then reacting them at the temperature of 225° to 280° C.

Namely, the compounds expressed by the formula (VI) to (X) in FIG. 2 are gained according to the first process, as shown in FIG. 1, in which a) rosins, b)dihydric alcohols and c)α,β-unsaturated carbonyl compounds are preliminarily reacted one by one or at the same time at 150° to 200° C. In this reaction, a Diels-Alder addition reaction of maleic anhydride and maleic acid expressed by the formula (IV) and rosin by formula (III) advances at the same time with half-esterification of maleic anhydride and maleic acid expressed by the formula (IV) and dihydric alcohol by formula (V), thereby the distillation of dihydric alcohol being considered to be restrained. The esterification product of the dihydric alcohol having a low boiling point and maleic anhydride or maleic acid converts into the form of a five-membered ring anhydride due to the cleavage of the ester part with maleic acid in the process of the reaction with rosin above 220° C., and is stabilized by the esterification of rosin with tertiary carboxylic acid. Namely, the main reaction products are maleopimaric acids expressed by formula (IV), diresinate of dihydric alcohol and rosin by formula (IX), diresinate of dihydric alcohol, rosin and maleopimaric acid by formula (XI) or (XII) and diresionate of dihydric alcohol and maleopimaric acid by formula (VIII), and polyester having MW of 900 or more is obtained as by-product.

Particularly, the component contributory to the size in neutral papermaking is diresionate of dihydric alcohol, rosin and maleopimaric acid expressed by formula (XI) and (XII). It is found that in the case of the production according to the invention, that at least 20 percent, was an effective amount (in neutral papermaking,) of the said effective component to be contained in the reaction product (see FIG. 4). While according to the conventional method, little of the effective component is contained therein (see FIG. 5).

Various sizing agents can be prepared using the said effective component.

The sizing agent can be adjusted by using the above-mentioned reaction products as they were, and in that case, the sizing agent for papermaking includes 1 to 10 percent by weight of the specific surfactant expressed the following formula(II),

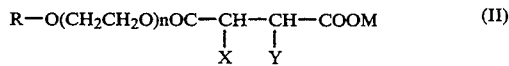

$$R-O(CH_2CH_2O)nOC-\underset{X}{CH}-\underset{Y}{CH}-COOM \qquad (II)$$

(in which R is alkylphenol group of C10 to C24 or linear or branch alkyl group of C10 to C24, n is an integer of 6 to 20, X or Y is H or $SO_3M$ and M is sodium, potassium or ammonium group), and 20 to 60 percent by weight of the concentration of the solid with the result that the sizing agent for papermaking having the excellent property in emulsification and storage stability can be obtained. Particularly, in the case of using the surfactant expressed by formula II, 0.5 to 10 percent by weight of casein is preferably also contained in the sizing agent. This is because the emulsification and stability is further enhanced by casein.

As concrete examples of the surfactant expressed by the above formula, there may be mentioned Aerosol A-103 (the correspondence to the above formula II where R is alkylphenol) manufactured by American Cyanamide Co., Ltd. and Softanol MES-12 (the correspondence to the above formula II where R is secondary alcohol) manufactured by Nippon Shokubi Co., Ltd.

80 to 99 parts by weight of the said solid of the reaction product and 1 to 20 parts by weight of the partial or complete saponification product of the copolymer of styrene-methacrylic acid-based monomer are dispersed into water, thereby the concentration of the solid being 20 to 60 percents by weight, resulting in a sizing agent for neutral papermaking having good emulsification and size without foaming at the time of papermaking, which operates effectively.

The partial or complete saponification product of styrene-methacrylic acid based-monomer means partial or complete saponification product of the copolymer which contains 15 to 40 percents by weight of styrene-based monomer, 5 to 40 percents by weight (meth)acrylatester-based monomer, 25 to 65 percents by weight of (meth)acrylic acid monomer and 0 to 15 percents by weight of other monomer and has an average molecular weight within the range of 5000 to 500,000.

Examples of styrene-based monomer include styrene, vinyltoluene, α-methylstyrene and one or more kinds of them can be used. As examples of (meth)acrylic ester-based monomer, there may be mentioned methyl acrylate, methyl metacrylate, ethyl acrylate, ethyl metacrylate, butyl acrylate, butyl metacrylate, 2-ethylhexyl acrylate, 2-ethylhexyl metacrylate, lauryl acrylate, lauryl metacrylate, stearyl acrylate, stearyl metacrylate and one or more kinds of them can be used. Examples of (meth)acrylic acid-based monomer includes acrylic acid and methacrylic acid and one or two kinds of them can be used. Other monomer includes styrene sulfonic acid, sodium styrene-sulfonate, polyoxyethylene arylnonylphenylethersulfonate, polyoxyetylene arylnonylphenyletersulfonate-ammonium salt, acrylamide, acrylonitrile, maleic anhydride, maleic acid, fumaric acid, itaconic acid and one or more kinds of them can be used.

As a method of producing partial or complete saponification product of styrene-methacrylic acid based copolymer, there may be mentioned a method which comprises; conducting the solution polymerization using hydrocarbon such as toluene and xylene, ketone such as methyl ethyl ketone or alcohol solvent such as isopropylalcohol and butylalcohol and adding peroxide- and azo-based polymerization initiators; saponificating with alkali such as Na, K and ammonia; giving water solubility ;and removing the solvent and a method comprising emulsion polymerization using the polymerization initiator such as persulfate, saponification with alkali such as Na, K and ammonia and giving water solubility.

Moreover, 60 to 95 parts by weight of the solid of said reaction product and 5 to 95 parts by weight of the copolymer (emulsifier polymer) of cationic vinyl monomer and aromatic vinyl monomer, cationic vinyl monomer and methacrylic ester , or cationic vinyl monomer, aromatic vinyl monomer and methacrylic ester are dispersed into water, thereby the concentration of the solid being 20 to 60 percent by weight, resulting in a sizing agent for neutral papermaking having a excellent size effect.

As the said emulsifier polymer, particularly for cationic vinyl monomer and/or methacrylic ester, it is preferable in the view of emulsification and size to use a product copolymerized under the presence of 0.1 to 15 molar percent of at least one selected from rosin acids, α,β-unsaturated carbonyl compounds, adduct rosin acid or rosin ester.

As a concrete example, basic monomer having a tertiary amino group is suitable for cationic vinyl monomer. For example, there may be mentioned dimethylaminoethyl methacrylate, diethylaminoethyl methacrylate, dimethylaminopropyl methacrylate, diethylaminopropyl methacrylate, dimethylaminoethyl mathacrylamide, diethylaminoethyl methacrylamide, dimethylaminopropyl methacrylamide and diethylaminopropyl methacrylamide. And salts between these basic monomers and inorganic or organic acid can be used.

Moreover, quaternary ammonium salt obtained by the reaction of the said basic monomer with a quaternary agent such as methyl chloride, benzyl chloride dimethyl sulfate and epichlorohydorin, dimethyldiallyl ammonium chloride and others can be used.

Further, styrene and derivatives thereof may be used as a aromatic vinyl monomer. For example, there may be mentioned styrene, α-methylstyrene and vinyltoluene.

(Meth)acrylic ester is ester of acrylic acid and/or methacrylic acid. As concrete examples, there may be mentioned methyl acrylate, methyl methacrylate, ethyl acrylate, ethyl methacrylate, butyl acrylate, butyl methacrylate, 2-ethylhexyl acrylate, 2-ethylhexyl methacrylate, lauryl acrylate, lauryl methacrylate, stearyl acrylate, stearyl methacrylate, hydroxyethyl acrylate, hydroxyethyl methacrylate, hydroxypropyl acrylate, hydroxypropyl methacrylate, hydroxybutyl acrylate, hydroxybutyl methacrylate.

As a rosin acid, gum rosin, wood rosin, tall oil rosin and others can be used. And as α,β-unsaturated carbonyl compound added rosin, maleic rosin, fumaric rosin and acrylic rosin can be used. And as a rosin ester, rosin ethylene glycol ester, rosin propylene glycol ester, rosin glycerin ester, maleic rosin ethylene glycol ester, maleic rosin glycerin ester and others can be used.

One or both of a aromatic vinyl monomer and a methacrylic ester can be used.

For example, cationic vinyl monomer and aromatic vinyl monomer and/or methacrylic ester are dissolved into the solvent under the presence of rosin acid or α,β-unsaturated carbonyl compound added rosin acid and rosin ester at the ratio of 0.5 to 15 molar percent to the said cationic vinyl monomer, aromatic vinyl monomer and/or methacrylic ester and heated under the presence of catalyst to be polymerized. After the completion of the reaction, the solvent is distilled, water is added for water dispersion and water solubility, with the result that the emulsifier polymer can be obtained.

As set forth hereinabove, the sizing agent according to the invention includes as a main component diester of rosin-based substances having a dicarboxylic acid or acid anhydride group expressed by the above formula (I), (in which $R_1$ represents a rosin acid residue or maleopimaric acid residue, $R_2$ represents a dihydric alcohol residue and $R_3$ represents a maleopimaric acid residue), therefore, the sizing agent showing excellent size effect in neutral papermaking.

And when the emulsifier according to the invention is used together with the sizing agent, the advantage such as excellent storage stability, no foaming and outstanding operation efficiency can be obtained.

On the other hand, the above-mentioned component represented by the formula (I') of the sizing agent is produced by reacting a)rosins, b)polyhydric alcohols, c)a polybasic (tribasic or more) carboxylic acid or its anhydride and d)α,β-unsaturated polybasic acid at the same time or one by one and it is preferably produced by reacting rosin, a polybasic (tribasic or more) carboxylic acid and/or its anhydride and polyhydric alcohol to obtain polyester reaction products in which bridges are partially formed, then reacting α,β-unsaturated polybasic acids. This is because, if rosin, α,β-unsaturated polybasic acid, tribasic or more carboxylic acid and/or its anhydride and polyhydric alcohols are reacted at the same time, the additional reaction of α,β-unsaturated polybasic acids and rosin by Diels-Alder reaction occurs with the esterification condensation reaction of said α,β-unsaturated polybasic acids and polyhydric alcohols.

Esterification condensation products can be obtained without using a tribasic or more carboxylic acid, but particularly in the range of pH 7 or more, the sizing property is unsatisfactory.

a) Rosins used in the invention may include tall rosin, gum rosin, and wood rosin or hydrogenation-, disproportionation- and formylation-modified products thereof.

b) Polyhydric alcohols used in the invention may include dihydric alcohols such as ethylene glycol, propylene glycol, neopentyl alcohol and the like, trihydric alcohols such as glycerine, trimethyrolpropane, trimethyrolethane and the like and tetrahydric alcohols such as pentaerythritol, dipentaerythritol and the like.

And c) tribasic or more carboxylic acid used in the invention may include 1,2,4-benzenetricarboxylic acid,
1,3,5-benzenetricarboxylic acid,
1,2,4-cycrohexanetoricarboxylic acid,
2,5,7-naphthalenetricarboxylic acid,
1,2,4-naphthalenetricarboxylic acid,
1,2,4-butanetricarboxylic acid,
1,2,5-hexanetricarboxylic acid,
1,2,4,5-benzenetetracarboxylic acid and anhydrides or esters thereof and the like. Among these substances, in view of the reactivity and cost, trimellitic anhydride is preferably used.

d) $\alpha,\beta$-unsaturated polybasic acid may include maleic anhydride, maleic acid, fumaric acid, itaconic anhydride and itaconic acid or lower alcohol monoester thereof and the like.

Preferably, the ratio of the hydroxyl group equivalents to the whole carboxyl group equivalent is COOH-/OH=1/0.2 to 1.0 at the beginning of the preparation and the additional amount of said $\alpha,\beta$-unsaturated polybasic acid is 2 to 20 parts by weight to 100 parts by weight of rosins. And the amount of trihydric or more carboxylic acid and/or its anhydride is preferably 0.5 to 20 molar % to the total carboxylic acid. If said amount is less than 0.5%, the size is unsatisfactory in the range of pH 7 or more and if more than 20 molar %, too much of a network-formation reaction proceeds with the result that a good emulsion state and size cannot be obtained.

In the case of preparing the sizing agent by dispersing the reaction product expressed by the above formula (I') into water, the surfactant expressed by the above formula (II), (in which R represents an alkylphenol group of C10 to C24 or linear or branch chain alkyl group, n represents integer of 6 to 20, X or Y is SO3M, M represents sodium, potassium or ammonium group), is added at 1 to 10% by weight to said reaction product to adjust the concentration of the solids therein to 20 to 60% by weight, resulting in the sizing agent for neutral papermaking which has excellent emulsification and storage stability. Casein is further added at 0.5 to 10% by weight to the sizing agent composite, resulting in better emulsion stability.

The above-mentioned surfactant is obtained by condensing alkylphenol or alcohol and ethylene oxide by a well-known method and further half-esterificating the resulting condensation product with sulfosuccinic acid. Examples thereof include Aerosol A-103 (the correspondence to the above formula (II) where R is alkylphenol) manufactured by American Cyanamide Co., Ltd. and Softanol MES-12 (the correspondence to the above formula (II) where R is secondary alcohol) by Nippon Shokubai Co., Ltd.

When 80 to 90 parts by weight of the reaction product containing the compound expressed the above formula (I') and 1 to 20 parts by weight of the partial or complete saponification product of a copolymer of styrene-methacrylic acid-based monomer are dispersed into water to adjust the concentration of the solids to 20 to 60% by weight, a sizing agent for neutral papermaking can be obtained which has good emulsification and size without foaming at the time of papermaking and which can operate effectively.

The partial or complete saponification product of a copolymer of styrene-methacrylic acid-based monomer means the partial or complete saponification product of the copolymer which contains 15 to 40 percent by weight of styrene-based monomer, 5 to 40 percent by weight of methacrylic ester-based monomer, 25 to 65 percent by weight of methacrylic acid-based monomer and 0 to 15 percent by weight of other monomer and has an average molecular weight within the range of 5000 to 500,000.

Examples thereof include styrene, vinyltoluene, $\alpha$-methylstyrene, and the like, and one or more kinds of them can be used. Examples of methacrylic ester-based monomer typically include methyl methacrylate, ethyl methacrylate, butyl methacrylate, 2-ethylhexyl methacrylate, lauryl methacrylate, stearyl acrylate, and the like, and one or more kinds of them can be used. Other monomers typically include styrene sulfate, sodium styrenesulfate, polyoxyethylene arylnonylphenylethersulfate ester-ammonium salt, acrylamide, acrylonitrile, maleic anhydride, maleic acid, fumaric acid, itaconic acid, and the like, and one or more kinds of them can be used.

As a producing method, there can be used a method which comprises a step of conducting the solution polymerization using a hydrocarbon such as toluene and xylene, a ketone such as methyl ethyl ketone or alcohol solvent such as isopropylalcohol and butylalcohol and peroxide- or azo-based polymerization initiator, a step of saponificating with Na, K, alkali and the like, and a step of giving water solubility and removing the solvent, and also a method which comprises a step of emulsion polymerization using a polymerization initiator such as persulfate, saponification with Na, K, alkali and the like, a step of water solubility giving and a step of solvent removal.

The sizing agent of the invention is capable of showing good sizing effect under the conditions of papermaking in the neutral range to weak alkaline range. Particularly, the component contributed to the sizing effect in such neutral papermaking, whose action is not known, has been proved to be the compound expressed by the above formula (I'), in which $\alpha,\beta$-unsaturated polybasic acids are added by Diels-Alder reaction to the esterification condensation product of rosin, trihydric or more carboxylic acid and/or its anhydride and polyhydric alcohol.

Polyester can be obtained without the tribasic or more carboxylic acid, but the sizing property thereof is unsatisfactory under the conditions of neutral papermaking in the range of pH 7 or more, or no size can be obtained depending on the formation, thereby resulting in no practical use.

Moreover, the sizing agent of the invention shows good size under the conditions of papermaking (above pH 7.5), for example, containing much calcium carbonate, therefore, it can be used for copier paper for copying machine. Said copier paper slips less than the copier paper using conventional alkylketenedimer-based sizing agents and shows stable sheet feeding.

Further, as the main component of the sizing agent for neutral to weak alkaline range, there may be used a mixture comprising 1) a rosin, 2) a rosin modified by $\alpha,\beta$-unsaturated carboxylic acids and/or anhydride thereof and 3) a polyhydric alcohol ester of rosin, which is used in a disperced form in water preferably with a mixture weight ratio of 0 to 30:20 to 70:30 to 80, more preferably 10 to 30:30 to 60:30 to 70.

As the rosin, gum rosin, wood rosin, tall rosin and modified rosin by hydrogenation-, disproportionation- and formylation-treatments can be used. And as the $\alpha,\beta$-unsaturated carboxylic acid, maleic anhydride, maleic acid, fumaric acid, itaconic anhydride, itaconic acid and lower alcohol monoesters thereof can be used. These rosins may be pre-treated by means of disproportionation or formaldehyde. And as polyhydric alcohol for esterification of rosin, dihydric alcohol such as ethylene glycol, propylene glycol, neopentyl glycol, dietanolamine and the like; trihydric alcohol such as glycerol, trimethylolpropane, trimethylolethane, trimethylolamine and the like; tetrahydric alcohol such as pentaerythritol, dipentaerythritol and the like can be used.

The sizing effect in neutral papermaking by use of the mixture rosin can be generated by combination of a hydrophobic property caused by 3)the polyhydric alcohol ester of rosin and changing to hydrophobic property and fixing to pulp by reaction between 1) the rosin and/or 2) the modified rosin and the band. Therefore, when only the rosin ester is used as the sizing agent, the hydrophobic property becomes high, so that the sufficient sizing effect can be obtained, but the fixing effect to pulp is decreased, resulting in no sizing effect in neutral papermaking. On the other hand, when only 1) the rosin and 2) the modified rosin are used, the fixing effect to pulp and the changing to a hydrophobic property are expected, but in the neutral papermaking, the reaction with the band is limited and thus the changing to the hydrophobic property can not advance to a sufficient degree, resulting in not sufficient sizing effect in the neutral papermaking.

In the case of preparing the sizing agent by dispersing the rosin mixture into water, the surfactant expressed by the above formula (II), is added at 1 to 10% by weight to said reaction products to adjust the concentration of the solids therein to 20 to 60% by weight, resulting in the sizing agent for neutral papermaking which has excellent emulsification and storage stability. Casein is further added at 0.5 to 10% by weight to the sizing agent composite, resulting in better emulsion stability.

The above-mentioned surfactant is obtained by condensing alkylphenol or alcohol and ethylene oxide by a well-known method and further half- esterificating the resulting condensation product with sulfosuccinic acid. Example thereof include Aerosol A-103 (the correspondence to the above formula (II) where R is alkylphenol) manufactured by American Cyanamide Co., Ltd. and Softanol MES-12 (the correspondence to the above formula (II) where R is secondary alcohol) by Nippon Shokubai Co., Ltd.

When 80 to 90 parts by weight of the rosin mixture and 1 to 20 parts by weight of the partial or complete saponification product of copolymer of styrene-methacrylic acid-based monomer are dispersed into water to adjust the concentration of the solids to 20 to 60% by weight, a sizing agent for neutral papermaking can be obtained which has good emulsification and size without foaming at the time of papermaking and operate effectively.

The paper sized by the sizing agent according to the present invention, is used for papers wherein electrophotography transcription by toner development occurs, and which are filled with calcium carbonate.

BRIEF DESCRIPTION OF DRAWING

FIG. 2 illustrates a structural formula of representative compounds and reaction products according to the production method of the invention.

FIG. 3 is structural formula illustrating the second process of the production method according to the invention.

FIG. 4 illustrates a GPC chart of the reaction product produced according to Synthesis Example 1.

FIG. 5 illustrates a GPC chart of the reaction product produced according to the Comparative Synthesis Example.

DETAILED DESCRIPTION OF THE INVENTION

Figure 1:
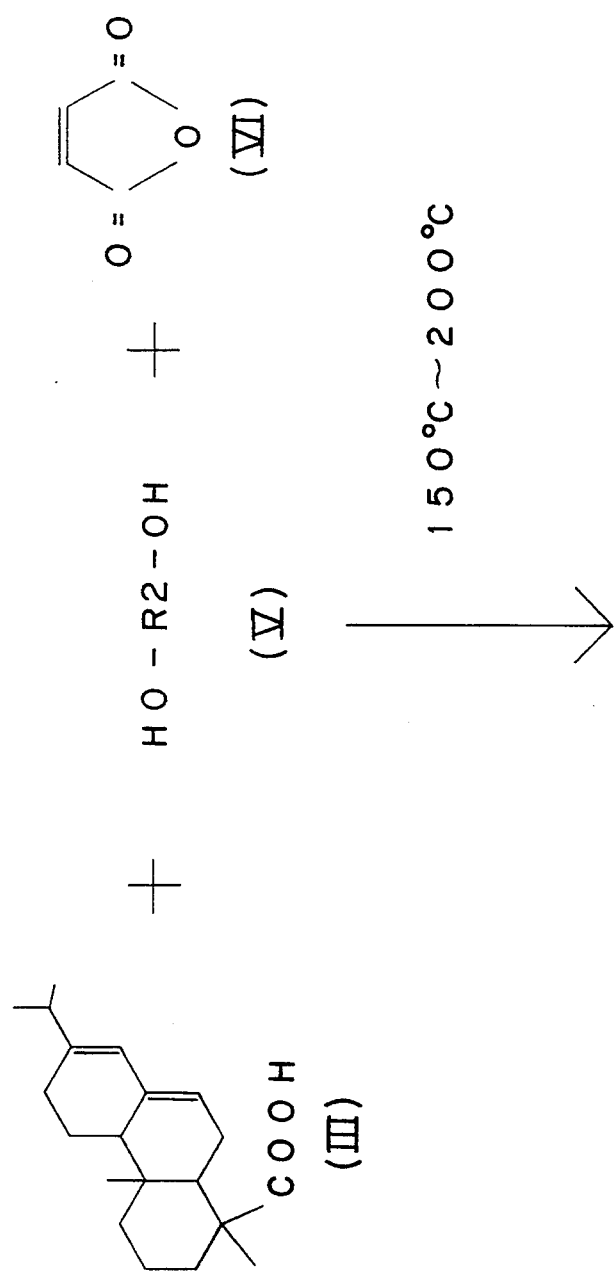
FIG. 1 is a structural formula illustrating the first process of the production method according to the invention.

The examples of the invention will be described in detail in the following section. The following Examples are presented to illustrate the invention, not to limit it. In the following description, unless otherwise stated, "parts" means parts by weight.

Synthesis of Rosin Derivatives

Synthesis Example 1

700 parts of tall oil rosin (acid number 170) was heated and melted at 160° C. under the charge of nitrogen gas into the four-neck flask for 1000 CC provided with an agitator, a thermometer, a water separator, condenser and nitrogen gas injection tube. 40.3 parts of propyleneglycol was added at this temperature.

(COOH:OH=1:0.9)

After the completion of the addition, 84 parts of maleic anhydride was added. After the completion of the addition of maleic anhydride, the temperature was raised to 250° C. in 2 hours. At 250° C., the reaction was conducted at the same time with removing water for 8 hours. The acid number of the obtained resin was 141.5.

Synthesis Example 2

700 parts of tall oil rosin(acid number 170) was heated and melted at 160° C. under the charge of nitrogen gas into the four-neck flask for 1000 CC provided with an agitator, a thermometer, a water separator, condenser and nitrogen gas injection tube. 24.2 parts of propyleneglycol was added at this temperature.

(COOH:OH=1:0.3)

After the completion of the addition, 84 parts of maleic anhydride was added. After the completion of the addition of maleic anhydride, the temperature was raised to 260° C. in 2 hours. At 260° C., the reaction was conducted at the same time with removing water for 8 hours. The acid number of the obtained resin was 168.

Synthesis Example 3

700 parts of tall oil rosin(acid number 170) was heated and melted at 160° C. under the charge of nitrogen gas into the four-neck flask for 1000 CC provided with an agitator, a thermometer, a water separator, condenser and nitrogen gas injection tube. 72.5 parts of propyleneglycol was added at this temperature.

(COOH:OH=1:0.9)

After the completion of the addition, 109.9 parts of maleic anhydride was added. After the completion of the addition of maleic anhydride, the temperature was raised to 240° C. in 2 hours At 240° C. the reaction was conducted at the same time with removing water for 8 hours. The acid number of the obtained resin was 100.7.

Synthesis Example 4

700 parts of tall oil rosin (acid number 170) was heated and melted at 160° C. under the charge of nitrogen gas into the four-neck flask for 1000 CC provided with an agitator, a thermometer, a water separator, condenser and nitrogen gas injection tube At 160° C. 84 parts of maleic anhydride was added. After the completion of the addition of maleic anhydride, the temperature was raised to 200° C. and the reaction was conducted for 2 hours. After the reaction, the temperature was lowered to 180° C. At this temperature, 56.4 parts of propyleneglycol was added.

(COOH:OH=1:0.7)

After the completion of the addition, the temperature was raised to 260° C. in 1 hours. At 260° C., the reaction was conducted at the same time with removing water for 8 hours. The acid number of the obtained resin was 120.

Synthesis Example 5

700 parts of tall oil rosin (acid number 170) was heated and melted at 160° C. under the charge of nitrogen gas into the four-neck flask for 1000 CC provided with an agitator, a thermometer, a water separator, condenser and nitrogen gas injection tube. At this temperature, 56.4 parts of propyleneglycol was added.

(COOH:OH=1:0.7)

After the completion of the addition, 84 parts of maleic anhydride was added at 160° C. After the completion of the addition of maleic anhydride, the temperature was raised to 240° C. in 2 hours. At 240° C., the reaction was conducted at the same time with removing water for 8 hours.

Synthesis Example 6

700 parts of tall oil rosin (acid number 170) was heated and melted at 160° C. under the charge of nitrogen gas into the four-neck flask for 1000 CC provided with an agitator, a thermometer, a water separator, condenser and nitrogen gas injection tube. At this temperature, 40.8 parts of ethyleneglycol was added.

(COOH:OH=1:0.62)

After the completion of the addition, 70 parts of maleic anhydride was added at 160° C. After the completion of the addition of maleic anhydride, the temperature was raised to 250° C. in 2 hours. At 250° C., the reaction was conducted at the same time with removing water for 8 hours. The acid number of the obtained resin was 119.

Synthesis Example 7

700 parts of tall oil rosin (acid number 170) was heated and melted at 160° C. under the charge of nitrogen gas into the four-neck flask for 1000 CC provided with an agitator, a thermometer, a water separator, condenser and nitrogen gas injection tube. At this temperature, 56.4 parts of propyleneglycol was added.

(COOH:OH=1:0.7)

After the completion of the addition, 84 parts of maleic anhydride was added. After the completion of the addition of maleic anhydride, the temperature was raised to 230° C. in 2 hours. At 230° C., the reaction was conducted at the same time with removing water for 8 hours. The acid number of the obtained rein was 131.

Synthesis Example 8

700 parts of tall oil rosin (acid number 170) was heated and melted at 160° C. under the charge of nitrogen gas into the four-neck flask for 1000 CC provided with an agitator, a thermometer, a division device, condenser and nitrogen gas injection tube. At this temperature, 56.4 parts of propyleneglycol was added.

(COOH:OH=1:0.7)

After the completion of the addition, 63 parts of maleic anhydride was added at 160° C. After the completion of the addition of maleic anhydride, the temperature was raised to 260° C. in 2 hours. At 260° C., the reaction was conducted at the same time with removing water for 8 hours. The acid number of the obtained resin was 107.

Comparative Synthesis Example 1

700 parts of tall oil rosin (acid number 170) was heated and melted at 160° C. under the charge of nitrogen gas into the four-neck flask for 1000 CC provided with an agitator, a thermometer, a water separator, condenser and nitrogen gas injection tube. At this temperature, 56.4 parts of propyleneglycol was added.

(COOH:OH=1:0.7)

After the completion of the addition, 84 parts of maleic anhydride was added at 160° C. After the completion of the addition of maleic anhydride, the temperature was raised to 200° C. in 1 hour. At 200° C., the reaction was conducted at the same time removing water for 8 hours. The acid number of the obtained resin was 146.

Comparative Synthesis Example 2

700 parts of tall oil rosin (acid number 170) was heated and melted at 160° C. under the charge of nitrogen gas into the four-neck flask for 1000 CC provided with an agitator, a thermometer, a water separator, condenser and nitrogen gas injection tube. At this temperature , 56.4 parts of propyleneglycol was added.

(COOH:OH=1:0.7)

After the completion of the addition, 84 parts of maleic anhydride was added at 160° C. After the completion of the addition of maleic anhydride, the temperature was raised to 210° C. in 1 hour. At 210° C., the reaction was conducted at the same time with removing water for 8 hours. The acid number of the obtained resin was 146.

Comparative Synthesis Example 3

(rosins according to the example of the Patent 60-16147 for comparison)

700 parts of tall oil rosin (acid number 170) was heated and melted at 210° C. under the charge of nitrogen gas into the four-neck flask for 1000 CC provided with an agitator, a thermometer, a water separator, condenser and nitrogen gas injection tube. 49 parts of maleic anhydride was added one part by one in 20 minutes. An hour later, 35 parts of propyleneglycol was added slowly in 20 minutes and kept at 210° C. for 3 hours.

(COOH:OH=1:0.43)

The acid number of the obtained resin was 140.

Comparative Synthesis Example 4

700 parts of tall oil rosin (acid number 170) was heated and melted at 160° C. under the charge of nitrogen gas into the four-neck flask for 1000 CC provided with an agitator, a thermometer, a water separator, condenser and nitrogen gas injection tube. At this temperature, 56.4 parts of propyleneglycol was added.

(COOH:OH=1:0.7)

After the completion of the addition, the temperature was raised to 260° C. in 2 hours. At 260° C., the reaction was conducted at the same time with removing water for 8 hours. The acid number of the obtained resin was 99.

Comparative Synthesis Example 5

700 parts of tall oil rosin (acid number 170) was heated and melted at 160° C. under the charge of nitrogen gas into the four-neck flask for 1000 CC provided with an agitator, a thermometer , condenser and nitrogen gas injection tube. 84 parts of maleic anhydride was added at 160° C. After the completion od maleic anhydride, the temperature was raised to 260° C. in 2 hours. The reaction was conducted at 260° C. for 4 hours. The acid number of the obtained resin was 191.

Comparative Synthesis Example 6

700 parts of formaldehyde treated tall oil rosin (acid number 165) was heated and melted at 200° C. under the charge of nitrogen gas into the four-neck flask for 1000 CC provided with an agitator, a thermometer, condenser and nitrogen gas injection tube. At 200° C., 60 parts of fumaric acid was divided and added in 30 minutes and maintained at this temperature for 2 hours. The acid number of the obtained resin was 225.

The reaction products of the above synthesis examples and comparative synthesis ones are analyzed for resin constant and GPC and Table 1 shows their results.

Particularly, FIG. 4 and FIG. 5 show the GPC charts of Synthesis 4 and Comparative synthesis 2. In the figures, the peak A indicates rosin acid part including rosin isomers such as abietic acid and dehydroabietic acid. The peak B indicates fortified rosin part including maleopimaric acid and so on. The peak C includes diester of rosin acid and propyleneglycol representative of formula (IV). The peak D includes the compounds expressed by the above formula (I), formula (XI) and formula (XII).

It seems clear by comparing FIG. 4 with FIG. 5 that the production states of the peak C, D and E are different. Particularly, the peak area of C and D is large and the ratio of rosin acid part (peak A) is small in Synthesis example 4 (FIG. 4). This suggests that the esterification to obtain the desired compounds proceeds effectively. On the other hands, in the view of the fact that the peaks of C and D are small and the detection start time of the peak E is before 1.40*10 minutes in the comparative synthesis example (FIG. 5), it is found that the expansion toward the higher molecular compounds is large and entirely different compounds are produced depending on the reaction conditions.

Therefore, diresinate of dihydric alcohol, rosin and maleopimaric acid expressed by formula (XI) or formula (XII) is contained at the effective amount (about more than 20% by weight) in the neutral papermaking in Synthesis example 4, but they do not reach the effective amount in Comparative synthesis example.

Polymerization of Emulsifier Polymer

Polymerization Example 1

10 parts of ammonium salt of arylnonylphenol EO 9 mol added sulfate, 45 parts of methacrylic acid, 15 parts of n-butylmethacrylate, 25 parts of styrene, 5 parts of α-methylstyrene, 2 parts of dodecylmercaptan, 7 parts of sodium dodecylbenzenesulfate, 350 parts of ion-exchange water, 10 parts of 10% of ammonium persulfate aqueous solution were mixed and agitated in the four-neck flask for 1000 CC provided with an agitator, a thermometer, a reflux condenser and a tap funnel. And they were kept at 85° C. for 5 hours and cooled to 50° C., then 132 parts of 20% of potassium hydroxide being added gradually. Then water was added and the light-yellow translucent liquid including 20% solid was obtained.

Polymerization Example 2

10 parts of rosin and 100 parts of isopropyl alcohol were put into the four-neck flask for 1000 CC provided with an agitator, a thermometer, a reflux condenser and a tap funnel and the flask was fully degassed with nitrogen gas, then the temperature being raised to the reflux temperature to melt rosin. The mixture solution of 60 parts of styrene, 30 parts of dimethylaminoethyl methacrylate and 2 parts of azobisisobutylnitrile was dropped into this in 1 hour and the reaction was conducted during reflux for 6 hours. And about 70 parts of isopropyl alcohol was distilled during heating, then the solution including 11 parts of acetic acid in 100 parts of water. The resulting Water-dispersant was further heated and the residual isopropyl alcohol was distilled.

And 330 parts of water was added, then, 18 parts of epichlorohydrine being added. The reaction was conducted at 85°–95° C. for an hour and water was added, resulting in blue-white translucent liquid including 20% solid.

Preparation of the Sizing Agent

EXAMPLE 1

200 parts of the resin according to Synthesis Example 1 was dissolved in 200 parts of toluene and 50 parts of polymer emulsifier (10 parts of effective component) according to Polymerization Example 1 and 350 parts of ion-exchange water was added and mixed with a homomixer at 40° C. Then this dispersant was passed through a piston type high pressure emulsifier once, resulting in fine dispersant. Thereafter, toluene and a little water were distilled by vacuum distillation, resulting in water-dispersant. The obtained emulsion contained 37% solid.

EXAMPLE 2

100 parts of the resin according to Synthesis Example 2 was melted at 180° C. and cooled to 130° C. 1212 parts of softanol MES-12 (3 parts of effective component) was added to this molten resin slowly during agitation, then 50 parts of 10% casein (5 parts of casein and 2.6 parts of 25% of aqueous ammonia diluted with water into 50 parts as a whole), was dropped gradually. 60 parts of additional hot water(95 C.) was dropped little by little and the mixture was converted into O/W type emulsion. Thereafter, 130 parts of hot water was added

EXAMPLE 3

200 parts of the resin according to Synthesis Example 3 was dissolved in 200 parts of toluene and 50 parts of polymer emulsifier (10 parts of effective component) according to Polymerization Example 1 and 350 parts of ion-exchange water were added and mixed at 40° C. with a homomixer. Then this dispersant was passed through a piston type high pressure emulsifier (200 kg/cm$^2$) once, resulting in fine dispersant. Thereafter, toluene and a little of water were distilled by vacuum distillation, resulting in water-dispersant. The obtained emulsion contained 37% solid.

EXAMPLE 4

200 parts of the resin according to Synthesis Example 4 was dissolved in 200 parts of toluene and 100 parts of polymer emulsifier (20 parts of effective component) according to Polymerization Example 2 and 350 parts of ion-exchange water were added and mixed at 40° C. with a homomixer. Then this dispersant was passed through a piston type high pressure emulsifier (200 kg/cm$^2$) once, resulting in fine dispersant. Thereafter, toluene and a little of water were distilled by vacuum distillation, resulting in water-dispersant. The obtained emulsion contained 35% solid.

EXAMPLE 5

200 parts of the resin according to Synthesis Example 5 was dissolved in 200 parts of toluene and 50 parts of polymer emulsifier (10 parts of effective component) according to Polymerization Example 1 and 350 parts of ion-exchange water were added and mixed at 40° C. with a homomixer. Then this dispersant was passed through a piston type high pressure emulsifier (200 kg/cm$^2$) once, resulting in fine dispersant. Thereafter, toluene and a little of water were distilled by vacuum distillation, resulting in water-dispersant. The obtained emulsion contained 37% solid.

EXAMPLE 6

200 parts of the resin according to Synthesis Example 6 was dissolved in 200 parts of toluene and 50 parts of polymer emulsifier (10 parts of effective component) according to Polymerization Example 1 and 350 parts of ion-exchange water were added and mixed at 40° C. with a homomixer. Then this dispersant was passed through a piston type high pressure homogenizer (200 kg/cm$^2$) once, resulting in fine dispersant. Thereafter, toluene and a little of water were distilled by vacuum distillation, resulting in water-dispersant. The obtained emulsion contained 37%.

EXAMPLE 7

200 parts of the resin according to Synthesis Example 7 was dissolved in 200 parts of toluene and 50 parts of polymer emulsifier (10 parts of effective component) according to Polymerization Example 1 and 350 parts of ion-exchange water were added and mixed at 40° C. with a homomixer. Then this dispersant was passed through a piston type high pressure homonizer (200 kg/cm$^2$) once, resulting in fine dispersant. Thereafter, toluene and a little of water were distilled by vacuum distillation, resulting in water-dispersant. The obtained emulsion contained 37% solid.

EXAMPLE 8

100 parts of the resin according to Synthesis Example 8 was melted at 180° C. and cooled to 130° C. 8.8 parts of Aerosol A-103 (3 parts of effective component) was added to this molten resin slowly during agitation and 70 parts of 6% casein solution (4 parts of casein and 2.0 parts of 25% aqueous ammonia diluted with water into 70 parts as a whole) was dropped little by little. 40 parts of additional hot water (95° C.) was dropped little by little and the mixture was converted into O/W type emulsion. Thereafter, 130 parts of hot water was added and the internal temperature was decreased rapidly to 30° C. The obtained emulsion contained 31% solid.

Comparative Example 1

100 parts of the resin according to Comparative Synthesis Example was melted at 180° C. and cooled to 130° C. 50 parts of 10% casein solution (5 parts of casein and 1.9 parts of 10% NaOH diluted with water into 50 parts as a whole) was dropped in this molten resin gradually during agitation. 60 parts of additional hot water (95° C.) was dropped gradually little and the mixture was converted into O/W type emulsion. Thereafter, 130 parts of hot water was added and the internal temperature was decreased rapidly to 30° C. The obtained emulsion contained 31% solid.

Comparative Example 2

200 parts of the resin according to Comparative Synthesis 1 was dissolved in 200 parts of toluene, and 50 parts of polymer homonizer (10 parts of effective component) according to Polymerization Example 1 and 350 parts of ion-exchange water were added and mixed at 40° C. with a homomixer. Then this dispersion was passed through a piston type high pressure emulsifier (200 kg/cm$^2$) once, resulting in fine dispersant. Thereafter, toluene and a little of water were distilled by vacuum distillation, resulting in water- dispersant. The obtained emulsion contained 37% solid.

Comparative Example 3

200 parts of the resin according to Comparative Synthesis Example 2 was dissolved in 200 parts of toluene, and 50 parts of polymer emulsifier (10 parts of effective component) according to Polymerization Example 1 and 350 parts of ion-exchange water were added and mixed at 40° C. with a homomixer. Then this dispersant was passed through a piston type high pressure homonizer (200 kg/cm$^2$) once, resulting in fine dispersant. Thereafter, toluene and a little of water were distilled by vacuum distillation, resulting in water-dispersant.

Comparative Example 4

100 parts of the resin according to Comparative Synthesis Example was melted at 150° C. and 10 parts of 25% borax aqueous solution was added slowly during agitation. 7 parts of casein and 225 parts of water were added to the water in oil-emulsion in this resulting till oil in water-emulsion was produced in water. The internal temperature was decreased to less than 30° C and water-dispersant was obtained.

Comparative Example 5

100 parts of the resin according to Comparative Synthesis Example was dissolved in 200 parts of toluene and 40 parts of 10% casein aqueous solution (4 parts of casein and 1.5 parts of 10% NaOH distilled with water into 40 parts as a whole) and 340 parts of ion-exchange water ware added and mixed at 40° C. with a homomixer. Then this dispersant was passed through a piston high pressure emulsifier (200 kg/cm²), resulting in fine dispersant. Thereafter, toluene and a little of water were distilled by vacuum distillation, resulting in water-dispersant. The obtained emulsion contained 35% solid.

Comparative Example 6

200 parts of the resin according to Comparative Synthesis Example 4 was dissolved in 200 parts of toluene and 50 parts of polymer homonizer (10 parts of effective component) according to Polymerization Example 1 and 350 parts of ion-exchange water were added and mixed at 40 C. with a homomixer. Then this dispersant was passed through a piston type high pressure emulsifier (200 kg/cm²) once, resulting in fine dispersant. Thereafter, toluene and a little of water were distilled by vacuum distillation, resulting in water-dispersant. The obtained emulsion contained 31% solid.

Comparative Example 7

200 parts of the resin according to Comparative Synthesis Example 5 was dissolved in 200 parts of toluene and 50 parts of polymer emulsifier (10 parts of effective component) according to Polymerization Example 1 and 350 parts of ion-exchange water were added and mixed at 40 C. with a homomixer. Then this dispersant was passed through a piston type high pressure homonizer (200 kg/cm²) once, resulting in fine dispersant. Thereafter, toluene and a little of water were distilled by vacuum distillation, resulting in water-dispersant. The obtained emulsion contained 31% solid.

Comparative Example 8

200 parts of the resin according to Comparative Synthesis Example 6 was dissolved in 200 parts of toluene and 24 parts of Softanol MES-12 (10 parts of effective component) and ion-exchange water ware added and mixed at 40 C. with a homomixer. Then this dispersant was passed through a piston type high pressure homonizer (200 kg/cm²) once, resulting in fine dispersant. Thereafter, toluene and a little of water were distilled by vacuum distillation, resulting in water-dispersant. The obtained emulsion contained 35% solid, The sizing agents according to the above-mentioned Example 1 to 8 and Comparative Example 1 to 8 are listed in Table 2. Each sizing agent was tested for storage stability and the results are shown in Table 2.

And the Steckigt sizing degree (second) was measured at pH 6.5, 4.0 and 7.5 of papermaking. The results are shown in Table 3.

Moreover, the foaming property was tested in white water and the results are shown in Table 4.

Size Test

Test method/
Pulp: L/NBKP (L/N 8/2) CSF 420 ml
Method: The fixed amount of calcium carbonate was added to 2.5% slurry of said pulp and agitated. Cationic starch was added during agitation, two minutes later, the sizing agent being added. Thirty seconds later, liquid alminium sulfate was added. Thirty seconds later, hand sheet was preparing with a laboratory sheet forming machine according to the conventional method.

The obtained handmade paper was kept in a room having constant temperature and constant humidity of 65% for 1 day and then took the sizing test.

| | Adjustment of pH |
|---|---|
| pH6.5 | 2% calcium carbonate to pulp |
| | 2% liquid alminium sulfate |
| pH7.0 | 10% calcium carbonate to pulp |
| | 2% liquid alminium sulfate |
| pH7.5 | 10% calcium carbonate to pulp |
| | 1% liquid alminium sulfate |

Foaming Property Evaluation

Test Method

Synthesized white water: 0.5 grams of calcium carbonate was dispersed into 900 milliliters of ion-exchange water and 0.7 grams of liquid aluminum sulfate (including 4.2% Al) was added to adjust pH to 7.3. To this liquid was added $Na_2SO_4$ to adjust the conductivity to 1000 μS/cm. The resulting liquid was used as synthesized white water. Method: The sizing agent was diluted with said synthesized white water to adjust the concentration of the sizing agent to 0.05% (solid) in the test solution and this solution was tested. 100 ml test solution was poured into the 200 ml measuring cylinder, a stopper was put on the cylinder and the cylinder was extremely shaken vertically and stood quietly. The change of the resulting foam was observed.

Standing Stability Test

Method: 500 grams of each water-dispersed solution was poured into 550 ml glass container and kept at 25° C. for 2 months, then, the storage stability test was taken. The agglomerate was filtered with a 200 mesh wire sieve and the precipitation amount of it to whole resin was calculated.

Synthesis of Rosin Derivatives

Synthesis Example 9

Seven hundred parts of tall rosin (acid number 170) is heated and melted at 160° C. under the charge of nitrogen gas into the four-neck flask for 1000 CC provided with an agitator, a thermometer, a water separator, condenser and nitrogen gas injection tube. At this temperature, 40 parts of propylene glycol is added.
(COOH:OH=1:0.9)
After the completion of the addition, 84 parts of maleic anhydride is added. After the completion of the addition of maleic anhydride, the temperature is raised to 250° C. in 2 hours. At 250° C., the reaction is conducted at the same time with removing water for 8 hour. Thereafter, 8 parts of trimellitic acid is added and reacted at 250° C. for 1 hour. The acid number of the obtained resin was 110.

Synthesis Example 10

The reaction was conducted under the same conditions as the Synthesis Example 9 except using 33 parts of glycerin (COOH:OH=1:0.9) instead of propylene glycol, resulting in the resin having the acid number of 85.

Synthesis Example 11

The reaction was conducted under the same conditions as the Synthesis Example 9 except using 36 parts of pentaerythritol (COOH:OH=1:0.9) instead of propylene glycol and 63 parts of maleic anhydride , resulting in the resin having the acid number of 58.

Synthesis Example 12

The reaction was conducted under the same conditions as the Synthesis Example 9 except using 43 parts of glycerin instead of propylene glycol and 99 parts of fumaric acid instead of maleic anhydride, resulting in the resin having the acid number of 68.

Comparative Synthesis Example 7

Seven hundred parts of tall rosin (acid number 170) is heated and melted at 160° C. under the charge of nitrogen gas into the four-neck flask for 1000 CC provided with an agitator, a thermometer, a water separator, condenser and nitrogen gas injection tube. At this temperature, 33 parts of glycerin is added.

(COOH:OH=1:0.9)

After the completion of the addition, 84 parts of maleic anhydride is added. After the completion of the addition of maleic anhydride, the temperature is raised to 250° C. in 2 hours. At 250° C., the reaction is conducted at the same time with removing water for 8 hour. The acid number of the obtained resin was 82.

Comparative Synthesis Example 8

The reaction was conducted under the same conditions as the Synthesis Example 10 except using 50 parts of trimellitic anhydride, resulting in gelation, therefore, the resin for estimating sizing property not being obtained.

Comparative Synthesis Example 9

The reaction was conducted under the same conditions as the Synthesis Example 9 except using 8 parts of trimellitic anhydride, resulting in the resin having the acid number of 105.

Comparative Synthesis Example 10

The reaction was conducted under the same conditions as the Synthesis Example 10 except not using trimellitic anhydride, resulting in the resin having the acid number of 78.

Comparative Synthesis Example 11

The reaction was conducted under the same conditions as the Synthesis Example 10 except not using maleic anhydride or trimellitic anhydride, resulting in the resin having the acid number of 45.

Polymerization of Emulsifier Polymer

Polymerization Example 3

Ten parts of ammonium salt of arylnonylphenol EO 9 mol added sulfate, 45 parts of methacrylic acid, 15 parts of n-butyl methacrylate, 25 parts of styrene, 5 parts of α-methylstyrene, 2 parts of dodecylmercaptan, 7 parts of sodium dodecylbenzensulfate, 350 parts of ion-exchange water and 10 parts of 10% ammonium persulfate were mixed and agitated in the four-neck flask for 1000 CC provided with an agitator, a thermometer, a reflux condenser and a tap funnel. And they were kept at 85 C. for 5 hours and cooled to 50 C., then 132 parts of 20% potassium hydroxide being added gradually. Then water was added and Emulsifier A of light-yellow translucent liquid including 20% solid was obtained.

Polymerization Example 4

Ten parts of rosin and 100 parts of isopropyl alcohol were pored into the four-neck flask for 1000 CC provided with an agitator, a thermometer, a reflux condenser and a tap funnel and said flask was fully degassed with nitrogen gas, then the temperature being raised to the reflux temperature to melt rosin. The mixture solution of 60 parts of styrene, 30 parts of dimethylaminoethyl methacrylate and 2 parts of azobisisobutylonitrile was dropped into this in 1 hour and the reaction was conducted during the reflux for 6 hours. And about 70 parts of isopropyl alcohol was distilled during heating, then the resolution including 11 parts of acetic acid in 100 parts of water. The resulting water-dispersant was further heated and the residual isopropyl alcohol was distilled.

And 330 parts of water was added, then 18 parts of epichlorohydrine being added. The reaction was conducted at 85-95 C. for an hour and water added, resulting in Emulsifier B of blue-white translucent liquid including the solid of 20%.

Preparation of the Water-dispersant

EXAMPLES 9-12

(high pressure method)

Two hundred parts of the resin according to Synthesis Example 9-12 was dissolved in 200 parts of toluene and 50 parts of polymer emulsifier (10 parts of effective component) according to Polymerization Example 3 and 350 parts of ion-exchange water were added and mixed with a homomixer at 40° C. Then this dispersant was passed through a piston type high pressure homonizer once, resulting in fine dispersant. Thereafter, toluene and a little of water were distilled by vacuum distillation, resulting in water-dispersant. The obtained emulsifier contained the solid of 37%.

EXAMPLE 13

(high pressure method)

Two hundred parts of the resin according to Synthesis Example 9 was dissolved in 200 parts of toluene and water-dispersant was obtained under the same conditions as said Example 1 except using 100 parts of the polymer emulsifier (20 parts of effective component) according to Polymerization Example 4. The resulting emulsion contained the solid of 37%.

EXAMPLE 14

(inversion method)

One hundred parts of the resin according to Synthesis Example 10 was melted at 180° C. and cooled to 130° C. Twelve parts of Softanol MES-12 (3 parts of effective component) was added to this molten resin slowly during agitation, then 50 parts of 10% casein (5 parts of casein and 2.6 parts of 25% aqueous ammonia diluted with water into 50 parts as a whole) being dropped little by little. Sixty parts of additional hot water (95° C.) was dropped little by little and the mixture was inversed into O/W type emulsion.

Thereafter, 130 parts of hot water was added and the internal temperature was rapidly decreased to 30° C. The resulting emulsion contained the solid of 31%.

EXAMPLE 15

(high pressure method)

Two hundred parts of the resin according to Synthesis Example 10 was dissolved in 200 parts of toluene and 100 parts of polymer emulsifier (20 parts of effective component) according to Polymerization Example 3 and 350 parts of ion-exchange water were added and mixed with a homomixer at 40° C. Then this dispersant was passed through a piston type high pressure homonizer once, resulting in fine dispersant. Thereafter, toluene and a little of water were distilled by vacuum distillation, resulting in water-dispersant. The obtained emulsion contained the solid of 37%.

EXAMPLE 16

(inversion method)

One hundred parts of the resin according to Synthesis Example 10 was melted at 180° C. and cooled to 130° C. Twelve parts of Aerosol A-103 (3 parts of effective component) was added to this molten resin slowly during agitation, then 40 parts of 10% casein (5 parts of casein and 2.6 parts of 25% aqueous ammonia diluted with water into 50 parts as a whole) being dropped little by little. Sixty parts of additional hot water (95° C.) was dropped little by little and the mixture was inversed into O/W type emulsion. Thereafter, 130 parts of hot water was added and the internal temperature was rapidly decreased to 30° C. The resulting emulsion contained the solid of 31%

EXAMPLE 17

(high pressure method)

Two hundred parts of the resin according to Synthesis Example 11 was dissolved in 200 parts of toluene and 100 parts of polymer emulsifier (20 parts of effective component) according to Polymerization Example 2 and 350 parts of ion-exchange water were added and mixed with a homomixer at 40° C. Then this dispersant was passed through a piston type high pressure homonizer once, resulting in fine dispersant. Thereafter, toluene and a little of water were distilled by vacuum distillation, resulting in water-dispersant. The obtained emulsion contained the solid of 35%.

EXAMPLE 18

(inversion method)

The emulsion was obtained under the same conditions as Example 14 except using the resin according to Synthesis Example 11 instead of that according to Synthesis Example 9.

The polymer according to said Polymerization Example 3 or 2, Aerosol A-103 or Softanol MES-12 was added to the resin according to said Comparative Synthesis Example 7 to 11 at the ratio listed in the following table and the sizing agent water-dispersant was prepared by way of a high pressure method or inversion method. This sample and the sizing agent water-dispersant according to said Example 9 to 18 were tested for storage stability and foaming property and both of the were compared. The results are shown in Table 5.

And the Steckigt sizing degree (second) was measured at pH 7.0, 7.5 and 8.0 of papermaking for the sizing agent water-dispersant according to said Example 9 to 18 and Comparative Example 1 to 9. The results are shown in the following Table 2.

Size Test

Test method

Pulp: L/NBKP (L/N 8/2) CSF 420 ml

Method: The fixed amount of calcium carbonate was added to 2.5% slurry of said pulp and agitated. Cationic starch was added during agitation, two minutes later, the sizing agent being added. Thirty seconds later, liquid alminium sulfate was added. Thirty seconds later, polyacrylamide-based rentention aid was added. Thirty seconds later, manual hand paper (66–70g/m$^2$) was prepared with a laboratory sheet forming machine according to the conventional method.

The obtained handmade paper was kept in a room having constant temperature and constant humidity of 65% for 1 day and then took the sizing test.

| Adjustment of pH | |
|---|---|
| pH7.0 | 10% calcium carbonate to pulp |
|  | 2% liquid alminium sulfate |
| pH7.5 | 10% calcium carbonate to pulp |
|  | 1% liquid alminium sulfate |
| pH8.0 | 20% calcium carbonate to pulp |
|  | 1% liquid alminium sulfate |

Foaming Property Evaluation

Test Method

Synthesized white water: 0.5 grams of calcium carbonate was dispersed into 900 milliliters of ion-exchange water and 0.7 grams of liquid aluminum sulfate (including 4.2% Al) was added to adjust pH to 7.3. To this liquid was added $Na_2S_{04}$ to adjust the conductivity to 1000 $\mu$S/cm. The resulting liquid was used as synthesized white water.

Method: The sizing agent was diluted with said synthesized white water to adjust the concentration of the sizing agent to 0.05% (solid) in the test solution and this solution was tested. One hundred milliliters of test solution was pored into the 200 ml measuring cylinder, a stopper was put on the cylinder and the cylinder was extremely shaken ten times in the vertical direction and stood quietly. The change of the resulting foam was observed. Standing Stability Test Method: Five hundred grams of each water-dispersant was poured into 550 ml glass container and kept at 25° C. for 2 months, then, the storage stability test was taken. The agglomerate was filtered with a 200 mesh wire sieve and the precipitation amount thereof to total resin was calculated.

As set forth hereinabove, the sizing agent according to the invention shows excellent size effect in neutral to alkaline range. And when the specific emulsifier is used, excellent storage stability and outstanding operation efficiency with no foaming would be generated.

Synthesis Example 13

660 parts of tall oil rosin (acid number 170) is heated and melted at 160° C. under the charge of nitrogen gas into the four-neck flask for 1000 CC provided with an agitator, a thermometer, a water separator, condenser and nitrogen gas injection tube. At this temperature, 50 parts of glycerol is added. At 250° C., esterification reaction is carried out to give a glycerol ester of tall oil rosin.

Synthesis Example 14

The reaction was conducted under the same conditions as the Synthesis Example 13 except using 61 parts of propylene glycol instead of glycerol, resulting in propylene ester of tall rosin.

Synthesis Example 15

The reaction was conducted under the same conditions as the Synthesis Example 1 except using 54 parts of pentaerythritol instead of glycerol, resulting in pentaerithritol ester of tall rosin.

Synthesis Example 16

The reaction was conducted under the same conditions as the Synthesis Example 13 except using gum rosin (acid number 170) instead of toll rosin, resulting in glycerol ester of gum rosin.

Polymerization of Emulsifier Polymer

Polymerization Example 5

10 parts of ammonium salt of arylnonylphenol EO 9 mol added sulfate, 45 parts of methacrylic acid, 15 parts of n-butyl methacrylate, 25 parts of styrene, 5 parts of α-methylstyrene, 2 parts of dodecylmercaptan, 7 parts of sodium dodecylbenzensulfate, 350 parts of ion-exchange water and 10 parts of 10% ammonium persulfate were mixed and agitated in the four-neck flask for 1000 CC provided with an agitator, a thermometer, a reflux condenser and a tap funnel. And they were kept at 85° C. for 5 hours and cooled to 50° C., then 132 parts of 20% potassium hydroxide being added gradually. Then water was added and Emulsifier of light-yellow translucent liquid including 20% solid was obtained.

Preparation of the Sizing Agent.

EXAMPLE 19

100 parts of the resin according to Synthesis Example 13 and 140 parts of maleic tall rosin (produced by reacting 100 parts of tall rosin with 20 parts of maleic anhydride under heating) and 60 parts of tall rosin were dissolved in 300 parts of toluene and 75 parts of polymer emulsifier (15 parts of effective component) according to Polymerization Example 5 and 525 parts of ion-exchange water was added and mixed with a homomixer at 40° C. Then this dispersant was passed through a piston type high pressure homogenizer(200 kg/cm$^2$) once, resulting in fine dispersant. Thereafter, toluene and a little water were distilled by vacuum distillation, resulting in water-dispersant. The obtained emulsion contained 37% solid.

EXAMPLE 20

100 parts of the resin mixture comprising the resin of to Synthesis Example 14, the maleic tall rosin and the tall rosin with mixture ratio of 5/3/2 is melted at 180° C. and cooled to 130° C. 8.8 parts of Softanol MES-12 (3 parts of effective component) was added to this molten resin slowly during agitation and 50 parts of 10% casein solution (5 parts of casein and 2.6 parts of 25% aqueous ammonia diluted with water into 50 parts as a whole) was dropped gradually. 60 parts of additional hot water (95° C.) was dropped gradually and the mixture was converted into O/W type emulsion. Thereafter, 130 parts of hot water was added and the internal temperature was decreased rapidly to 30° C. The obtained emulsion contained 31% solid.

EXAMPLES 21 AND 22

Those Examples were carried out at the same condition as Example 19 expect using the resins produced in the Synthesis Examples 15 and 16 as the rosin ester, to give emulsion products.

EXAMPLES 23 TO 26

Except using the rosin mixture comprising the resin of the Synthesis Example 13, the maleic tall rosin and the gum rosin with the mixture ratio shown in Table 7, the Examples were carried out at the same condition as Example 19, to give emulsion products.

Comparative Examples 12 to 15

Except using the rosin mixture comprising the resin of the Synthesis Example 21, the maleic tall rosin and the tall rosin with the mixture ratio shown in Table 8, the Examples were carried out at the same condition as Example 19, to give emulsion products.

The Steckigt sizing degree (second) was measured at pH 6.5, 7.0 and 7.5 of papermaking for the sizing agent water-dispersant according to said Example 19 to 26 and Comparative Example 12 to 15. The results are shown in the following Table 9.

Size Estimation

Test method

Pulp: L/NBKP (L/N 8/2) CSF 420 ml

Method: The fixed amount of calcium carbonate was added to 2.5% slurry of said pulp and agitated. Cationic starch was added during agitation, two minutes later, the sizing agent being added. Thirty seconds later, liquid alminium sulfate was added. Thirty seconds later, polyacrylamide-based rentention aid was added. Thirty seconds later, manual hand paper (66–70g/m$^2$) was prepared with a laboratory sheet forming machine according to the conventional method. The obtained handmade paper was kept in a room having constant temperature and constant humidity of 65% for 1 day and then took the sizing test.

|  | Adjustment of pH |
|---|---|
| pH6.5 | 2% calcium carbonate to pulp |
|  | 5% liquid alminium sulfate |
| pH7.0 | 10% calcium carbonate to pulp |
|  | 2% liquid alminium sulfate |
| pH7.5 | 10% calcium carbonate to pulp |
|  | 1% liquid alminium sulfate |

The following Tables 1–9, summarize relevant data pertaining to the prior examples.

TABLE 1

| resin | reation temp. | * alcohol | modification ratio OH/COOH rosin | anbydrous maleic acid % rosin | resin specifications AV · SP | **GPC analysis (peak area %) E ***0.835 | D 0.87~0.90 | C 0.91~0.93 | B 0.953 | A 1.000 |
|---|---|---|---|---|---|---|---|---|---|---|
| S EX. 1 | 250° C. | PG | 0.50 | 12.0 | 141.5 · 91.0 | — | 33.8 | 15.3 | 22.1 | 28.8 |
| S EX. 2 | 260° C. | PG | 0.30 | 12.9 | 168.0 · 96.0 | — | 24.8 | 10.7 | 28.2 | 36.4 |
| S EX. 3 | 240° C. | PG | 0.90 | 15.7 | 100.7 · 91.0 | 15.1 | 33.8 | 20.6 | 12.6 | 18.0 |
| S EX. 4 | 260° C. | PG | 0.70 | 12.0 | 120.0 · 95.0 | 13.5 | 30.4 | 17.6 | 16.0 | 22.6 |
| S EX. 5 | 240° C. | PG | 0.70 | 12.0 | 123.6 · 94.5 | 12.9 | 28.8 | 17.3 | 17.7 | 23.3 |
| S EX. 6 | 250° C. | EG | 0.62 | 10.0 | 119.0 · 88.5 | 11.0 | 25.4 | 19.3 | 14.4 | 29.9 |
| S EX. 7 | 230° C. | PG | 0.70 | 12.0 | 131.0 · 98.0 | 18.0 | 24.5 | 13.2 | 16.9 | 27.4 |
| S EX. 8 | 260° C. | PG | 0.70 | 9.0 | 107.0 · 86.0 | 13.2 | 22.7 | 24.5 | 12.2 | 27.4 |
| Com S EX. 1 | 200° C. | PG | 0.70 | 12.0 | 146.0 · 96.0 | 21.3 | 14.5 | 6.9 | 20.1 | 37.3 |
| Com S EX. 2 | 210° C. | PG | 0.70 | 12.0 | 146.0 · 99.0 | 20.4 | 14.4 | 7.6 | 20.1 | 37.5 |

TABLE 1-continued

| resin | reation temp. | *alcohol | modification ratio OH/COOH rosin | anbydrous maleic acid % rosin | resin specifications AV · SP | **GPC analysis (peak area %) E ***0.835 | D 0.87~0.90 | C 0.91~0.93 | B 0.953 | A 1.000 |
|---|---|---|---|---|---|---|---|---|---|---|
| Com S EX. 3 | 210° C. | PG | 0.43 | 7.0 | 140.0 · 87.0 | 12.5 | 12.5 | 12.8 | 13.4 | 48.8 |
| Com S EX. 4 | 260° C. | PG | 0.70 | 0.0 | 99.0 · 68.5 | — | 7.0 | 37.1 | — | 56.0 |
| Com S EX. 5 | 260° C. | — | 0.00 | 12.0 | 215.0 · 102.0 | — | 12.2 | — | 32.7 | 55.1 |

*alcohol; PG: propylene glycol, EG: ethylene glycol
**GPC analysis: column: TSKgel G2000H XL 7.8 mm × 30 cm × 2 eluate; THF, flow rate; 1.0 ml/min., detection; RI
***A: rosin acid part (MW 290~315)
B: modified rosin part (MW 390~420)
C: rosin ester compound (MW 580~660)
D: rosin ester compound (MW 670~880): General formula (1)
E: high molecular material (MW 900~)
The values at each peak show relative maintaining ratio (on the basis of the rosin maintaining time = 100)

TABLE 2

| Sizing agent | Rosin derivatives | Compounding ratio Emulsifier | % | Casein % | Emulsion method | *average particle size (μm) | **Standing Stability |
|---|---|---|---|---|---|---|---|
| EX. 1 | S EX. 1 | Poly EX. 1 | 5 | — | high-pressure | 0.3 | 0.1%> |
| EX. 2 | S EX. 2 | MES-12 | 3 | 5 | inversion | 0.4 | 0.1%> |
| EX. 3 | S EX. 3 | Poly EX. 1 | 5 | — | high-pressure | 0.3 | 0.1%> |
| EX. 4 | S EX. 4 | Poly EX. 2 | 10 | — | high-pressure | 0.3 | 0.1%> |
| EX. 5 | S EX. 5 | Poly EX. 1 | 5 | — | high-pressure | 0.3 | 0.1%> |
| EX. 6 | S EX. 6 | Poly EX. 1 | 5 | — | high-pressure | 0.3 | 0.1%> |
| EX. 7 | S EX. 7 | Poly EX. 1 | 5 | — | high-pressure | 0.3 | 0.1%> |
| EX. 8 | S EX. 8 | A-103 | 3 | 4 | inversion | 0.4 | 0.1%> |
| Com. EX. 1 | Com S EX. 1 | — | — | 5 | inversion | 1.3 | 1.5% |
| Com. EX. 2 | Com S EX. 1 | Poly EX. 1 | 5 | — | high-pressure | 0.3 | 0.1%> |
| Com. EX. 3 | Com S EX. 2 | Poly EX. 1 | 5 | — | high-pressure | 0.3 | 0.1%> |
| Com. EX. 4 | Com S EX. 3 | — | — | 7 | inversion | 1.8 | 2.8% |
| Com. EX. 5 | Com S EX. 3 | — | — | 4 | high-pressure | 0.4 | 0.3% |
| Com. EX. 6 | Com S EX. 4 | Poly EX. 1 | 5 | — | high-pressure | 0.4 | 0.3% |
| Com. EX. 7 | Com S EX. 5 | Poly EX. 1 | 5 | — | high-pressure | 0.4 | 0.3% |
| Com. EX. 8 | Com S EX. 6 | MES-12 | 3 | — | high-pressure | 0.3 | 0.1%> |

*average particle size: measured by DLS-700 (dynamic light scattering method; made by Otsuka Electronics Ltd.)
**Standing Stability: precipitation amount (%) for 2 month under keeping at 25° C.

TABLE 3

| Sizing agent | Stöckigt sizing degree (second) paper making pit 6.5 | 7.0 | 7.5 |
|---|---|---|---|
| EX. 1 | 18.1 | 16.7 | 13.2 |
| EX. 2 | 17.5 | 15.4 | 11.8 |
| EX. 3 | 17.9 | 16.3 | 12.9 |
| EX. 4 | 19.0 | 18.0 | 14.8 |
| EX. 5 | 19.5 | 17.5 | 13.8 |
| EX. 6 | 18.9 | 16.8 | 12.9 |
| EX. 7 | 17.8 | 16.9 | 11.7 |
| EX. 8 | 17.8 | 16.8 | 11.9 |
| Com. EX. 1 | 12.6 | 6.8 | 2.9 |
| Com. EX. 2 | 13.8 | 6.8 | 3.1 |
| Com. EX. 3 | 15.3 | 10.3 | 4.5 |
| Com. EX. 4 | 7.3 | 2.8 | 1.2 |
| Com. EX. 5 | 14.5 | 8.1 | 3.4 |
| Com. EX. 6 | 0.0 | 0.0 | 0.0 |
| Com. EX. 7 | 13.9 | 6.5 | 1.8 |
| Com. EX. 8 | 13.7 | 2.5 | 0.0 |

TABLE 4

| Sizing agent | Foaming Property Evaluation *deforming test Foam volume (ml) 30 sec. | 3 min. | 5 min. |
|---|---|---|---|
| EX. 1 | 30 | <5 | <5 |
| EX. 3 | 25 | <5 | <5 |
| EX. 5 | 30 | <5 | <5 |
| EX. 6 | 30 | <5 | <5 |
| EX. 7 | 30 | <5 | <5 |
| Com. EX. 1 | 35 | 30 | 30 |
| Com. EX. 4 | 40 | 30 | 30 |
| Com. EX. 5 | 40 | 35 | 30 |
| Com. EX. 8 | 35 | 30 | 30 |

TABLE 5

| Sizing agent | Sizing agent (aqueous dispersion) Rosin derivatives | Compounding ratio Emulsifier | % | Casein % | Emulsion method | *1 (μm) | *2 | *3 |
|---|---|---|---|---|---|---|---|---|
| EX. 9 | S EX. 1 | Poly EX. 1 | 5 | — | high-pressure | 0.3 | 0.1%> | ⊙ |
| EX. 10 | S EX. 2 | Poly EX. 1 | 5 | — | high-pressure | 0.3 | 0.1%> | ⊙ |
| EX. 11 | S EX. 3 | Poly EX. 1 | 5 | — | high-pressure | 0.3 | 0.1%> | ⊙ |
| EX. 12 | S EX. 4 | Poly EX. 1 | 5 | — | high-pressure | 0.3 | 0.1%> | ⊙ |

TABLE 5-continued

| Sizing agent | Rosin derivatives | Sizing agent (aqueous dispersion) Compounding ratio | | | | | | |
|---|---|---|---|---|---|---|---|---|
| | | Emulsifier | % | Casein % | Emulsion method | *1 (μm) | *2 | *3 |
| EX. 13 | S EX. 1 | Poly EX. 2 | 10 | — | high-pressure | 0.3 | 0.1%> | ○ |
| EX. 14 | S EX. 1 | MES-12 | 3 | 5 | inversion | 0.4 | 0.1%> | △ |
| EX. 15 | S EX. 2 | Poly EX. 2 | 10 | — | high-pressure | 0.3 | 0.1%> | ○ |
| EX. 16 | S EX. 2 | A-103 | 3 | 4 | inversion | 0.4 | 0.1%> | △ |
| EX. 17 | S EX. 3 | Poly EX. 2 | 10 | — | high-pressure | 0.3 | 0.1%> | ○ |
| EX. 18 | S EX. 3 | MES-12 | 3 | 5 | inversion | 0.4 | 0.1%> | △ |
| Com. EX. 1 | Com S EX. 1 | Poly EX. 1 | 5 | — | high-pressure | 0.3 | 0.1%> | ⊙ |
| Com. EX. 2 | Com S EX. 2 | None | | | | | | |
| Com. EX. 3 | Com S EX. 3 | Poly EX. 1 | 5 | — | high-pressure | 0.3 | 0.1%> | ⊙ |
| Com. Ex. 4 | Com S EX. 4 | Poly EX. 1 | 5 | — | high-pressure | 0.3 | 0.1%> | ⊙ |
| Com. EX. 5 | Com S EX. 3 | Poly EX. 2 | 10 | — | high-pressure | 0.3 | 0.1%> | ⊙ |
| Com. EX. 6 | Com S EX. 4 | MES-12 | 3 | 5 | inversion | 0.4 | 0.3% | △ |
| Com. EX. 7 | Com S EX. 5 | Poly EX. 1 | 5 | — | high-pressure | 0.3 | 0.1%> | ⊙ |
| Com. EX. 8 | Com S EX. 4 | A-103 | 3 | 4 | inversion | 0.4 | 0.1%> | △ |
| Com. EX. 9 | Com S EX. 4 | — | — | 7 | inversion | 1.8 | 3.5% | |

*1 average size of particle: measured by DLS-700 (dynamic light scattering method; made by Otsuka Electronics Ltd.)
*2 Standing Stability: precipitation amount (%) for 2 month under keeping at 25° C.
*3 Foaming test: Foam volume after 5 minute stauding.
⊙ 5 ml
○: 6~30 ml
△: 31 ml <

TABLE 6

Size Test

| Sizing agent | Stöckigt sizing degree (second) paper making pH | | |
|---|---|---|---|
| | 7.0 | 7.5 | 8.0 |
| EX. 1 | 23.2 | 19.4 | 17.2 |
| EX. 2 | 24.5 | 20.3 | 19.4 |
| EX. 3 | 23.5 | 20.1 | 18.9 |
| EX. 4 | 20.2 | 18.5 | 17.5 |
| EX. 5 | 23.5 | 19.6 | 17.5 |
| EX. 6 | 20.1 | 18.1 | 16.9 |
| EX. 7 | 23.5 | 18.6 | 17.2 |
| EX. 8 | 20.1 | 18.0 | 16.7 |
| Com. EX. 1 | 14.2 | 7.1 | 2.1 |
| Com. EX. 2 | — | — | — |
| Com. EX. 3 | 13.2 | 8.5 | 5.9 |
| Com. EX. 4 | 14.5 | 10.1 | 6.1 |
| Com. EX. 5 | 12.8 | 5.5 | 1.2 |
| Com. EX. 6 | 12.3 | 5.2 | 1.5 |
| Com. EX. 7 | 2.3 | 0 | 0 |
| Com. EX. 8 | 6.8 | 1.2 | 0 |
| Com. EX. 9 | 6.5 | 0 | 0 |

TABLE 7

| | Synthesis Example 1 | Maleic tall rosin | Gum rosin |
|---|---|---|---|
| EX. 23 | 50 | 20 | 30 |
| EX. 24 | 30 | 60 | 10 |
| EX. 25 | 70 | 30 | 0 |
| EX. 25 | 30 | 70 | 0 |

TABLE 8

| | Synthesis Example 3 | Maleic tall rosin | Tall rosin |
|---|---|---|---|
| EX. 18 | 50 | 10 | 40 |
| EX. 19 | 20 | 40 | 40 |
| EX. 20 | 90 | 10 | 0 |
| EX. 21 | 20 | 60 | 20 |

TABLE 9

| Sizing agent | Stöckigt sizing degree (second) paper making pH | | |
|---|---|---|---|
| | 6.5 | 7.0 | 7.5 |
| EX. 19 | 25.3 | 22.2 | 20.2 |
| EX. 20 | 20.7 | 17.5 | 16.4 |
| EX. 21 | 26.5 | 22.3 | 21.5 |
| EX. 22 | 26.8 | 24.5 | 23.7 |
| EX. 23 | 26.5 | 24.3 | 22.0 |
| EX. 24 | 19.4 | 17.4 | 15.3 |
| EX. 24 | 17.9 | 12.5 | 11.2 |
| EX. 25 | 20.6 | 13.2 | 12.0 |
| EX. 18 | 13.2 | 8.9 | 6.1 |
| EX. 19 | 15.4 | 10.6 | 8.7 |
| EX. 20 | 7.1 | 4.8 | 2.1 |
| EX. 21 | 15.8 | 8.7 | 5.5 |

What is claimed is:

1. A sizing agent for papermaking in a neutral range characterized in that a main component of said sizing agent is selected from the group consisting of:

1) a diester of a rosin-based substance having a dicarboxylic acid or acid anhydride group expressed by the following formula (I), $$R_1-C(O)O-R_2-OC(O)-R_3 \qquad (I)$$

in which $R_1$ represents a rosin acid residue or maleopimaric acid, $R_2$ represents a dihydric alcohol residue and $R_3$ represents a maleopimaric acid residue;

2) a polyester reaction product expressed by the following formula (I'),

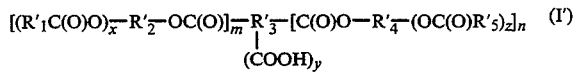
(I')

wherein $R'_1$ and $R'_5$ represent a rosin acid residue or an $\alpha,\beta$-unsaturated polybasic carboxylic acid added rosin residue, with the proviso that at least one of them represents an $\alpha,\beta$-unsaturated polybasic carboxylic acid added rosin residue, $R'_2$ and $R'_4$ represent polyhydric alcohol residues which may be the same or different, $R'_3$ represents a polybasic carboxylic acid residue being at least tribasic, x and z are integers of 1 to 3, y is 0 or 2, and m and n are 1 or 2; and 3) a mixture comprising a rosin, a rosin modified by an $\alpha,\beta$-unsaturated carboxylic acid or an anhydride thereof, and a polyhydric alcohol ester of rosin.

2. The sizing agent according to claim 1, for papermaking in a neutral range further comprising 1 to 10% by weight of a surfactant expressed by the following formula (II),

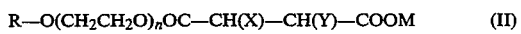
(II)

wherein R is an alkylphenol group of C10 to C24 or a linear or branched alkyl group of C10 to C24, n is an integer of 6 to 20, X and Y are selected from the group consisting of a hydrogen atom or —SO$_3$M, wherein M is a sodium atom, a potassium atom or an ammonium group; thereby adjusting the concentration of solids in the sizing agent to 20 to 60% by weight.

3. The sizing agent according to claim 2, further comprising casein at 1 to 10% by weight of the sizing agent components.

4. The sizing agent according to claim 1, which comprises the following ingredients dispersed in a water: 80 to 99 parts by weight of the sizing agent component expressed by the above formula (I) or (I') or the rosin mixture, and in addition thereto 1 to 20 parts by weight of a partial saponification or complete saponification product of a copolymer of styrene and methacrylic acid monomer.

5. The sizing agent according to claim 1, wherein the rosin mixture comprises 0 to 30 weight parts of the rosin and 20 to 70 weight parts of the modified rosin and 30 to 80 weight parts of the rosin ester.

6. An emulsion of the sizing agent according to claim 1 characterized in that the emulsion contains:
60 to 95 parts by weight of solids of the sizing agent represented by the formula (I), and
5 to 95 parts by weight of solids of an emulsifying copolymer of a cationic vinyl monomer with 1) an aromatic vinyl monomer, 2) a methacrylic ester or 3) a mixture of an aromatic vinyl monomer and a methacrylic ester; and
wherein the solids are dispersed in a water to adjust the concentration of the solids in the emulsion to 20 to 60% by weight.

7. The sizing agent according to claim 6, wherein said emulsifying copolymer is a reaction product produced by copolymerizing a cationic vinyl monomer, a methacrylic ester, or a mixture thereof, under the presence of 0.1 to 1.5 molar % of at least one compound selected from the group consisting of a rosin acid, an $\alpha,\beta$-unsaturated carbonyl compound added rosin acid and a rosin ester.

8. The sizing agent according to claim 1, further comprising an effective amount of a calcium carbonate filler, for use of the sizing agent in a paper for electrophotography transcription by toner development.

9. A method of producing a sizing agent for papermaking in a neutral range, comprising:
reacting a) rosins, b) dihydric alcohols and c) $\alpha,\beta$-unsaturated carbonyl compounds, singularly or at the same time in a manner such that the ratio of the hydroxyl group equivalent of b) to the carboxyl group equivalent of a) is 0.2 to 1.5,
obtaining at least one reaction product containing a diester of a rosin-based substance having a carboxylic acid or acid anhydride group, and which is expressed by formula (I), $$R_1-C(O)O-R_2-OC(O)-R_3 \quad (I)$$

in which $R_1$ represents a rosin acid residue or maleopimaric acid, $R_2$ represents a dihydric alcohol residue and $R_3$ represents a maleopimaric acid residue; and
dispersing said reaction product into water.

10. A method of producing a sizing agent for papermaking in a neutral range characterized in that it comprises:
reacting a rosin with a polyhydric alcohol, and then reacting therewith a polybasic carboxylic acid being at least tribasic, an anhydride thereof, or a mixture thereof, to provide complete esterification;
adding an $\alpha,\beta$-unsaturated polybasic acid to the rosin, thereby resulting in a reaction product expressed by the following formula (I'),

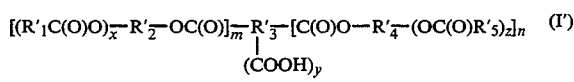
(I')

in which $R'_1$ and $R'_5$ represent a rosin acid residue or an $\alpha,\beta$-unsaturated polybasic carboxylic acid added rosin residue, provided that at least one of $R'_1$ and $R'_5$ represents an $\alpha,\beta$-unsaturated polybasic carboxylic acid added rosin residue, $R'_2$ and $R'_4$ represent polyhydric alcohol residues, $R'_3$ represents a polybasic carboxylic acid residue being at least tribasic, x and z are integers of 1 to 3, y is 0, 1 or 2, and m and n are 1 or 2);
and dispersing the Formula (I') compound reaction product into a water.

11. The method of producing a sizing agent according to claim 10, wherein the polybasic carboxylic acid being at least tribasic, the anhydride thereof, or the mixture thereof constitute 0.5 to 20 molar % of the total carboxylic acid in the sizing agent.

12. The method of producing a sizing agent according to claim 9 or 10, wherein 1 to 10% by weight of a surfactant expressed by formula (II) is used to adjust the concentration of solids in the sizing agent to 20 to 60% by weight upon dispersing said reaction product into water;

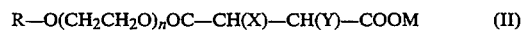
(II)

wherein R is an alkylphenol group of C10 to C24 or a linear or branched alkyl group of C10 to C24, n is an integer of 6 to 20, X and Y are selected from the group consisting of a hydrogen atom or —SO$_3$M, wherein M is a sodium atom, a potassium atom or an ammonium group.

13. The method of producing a sizing agent according to claim 12 further comprising dispersing 0.5 to 10% by weight of casein into the water.

14. The method of producing a sizing agent according to claim 9 or 10 wherein 1 to 20 parts by weight of solids of a partial saponification or complete saponification product of a copolymer of a styrene-methacrylic acid based monomer is combined together with 80 to 99 parts by weight of solids of said reaction product to obtain a solids concentration of 20 to 60% by weight upon dispersing said reaction product into water.

15. The method of producing a sizing agent according to claim 9, wherein 5 to 95 parts by weight of an emulsifying copolymer of a cationic vinyl monomer with 1) an aromatic vinyl monomer, 2) a methacrylic ester, or 3) a mixture of an aromatic vinyl monomer and a methacrylic ester, is combined with 60 to 95 parts by weight of said reaction product to adjust the concentration of solids in the sizing agent to 20 to 60% by weight upon dispersing said reaction product into a water.

16. The method of producing a sizing agent according to claim 15, wherein said emulsifying copolymer is a reaction product produced by copolymerizing a cationic vinyl monomer, methacrylic ester, or a mixture thereof, under the presence of 0.1 to 15 molar of at least one compound selected from the group consisting of a rosin acid, an $\alpha,\beta$-unsaturated carbonyl compound added rosin acid and a rosin ester.

17. The method of producing a sizing agent according to claim 9 or 10, wherein the process comprises reacting together a) rosins, b) dihydric alcohols having a boiling point of 210° C. or less and c) $\alpha,\beta$-unsaturated carbonyl compounds, singularly or at the same time, as follows:

reacting the rosins, the dihydric alcohols or the carbonyl compounds below the boiling point of said dihydric alcohols; and then reacting the rosins, the dihydric alcohols or the carbonyl compounds at 225° C. to 280° C.

* * * * *